US008596807B2

(12) United States Patent
Jeong et al.

(10) Patent No.: US 8,596,807 B2
(45) Date of Patent: Dec. 3, 2013

(54) BACKLIGHT UNIT AND DISPLAY APPARATUS USING THE SAME HAVING A REFLECTOR THAT INCLUDES A DIFFUSE REFLECTION AREA

(75) Inventors: Youn Mo Jeong, Seoul (KR); Tae Jin Kim, Seoul (KR); Se Jin Ko, Seoul (KR); Ki Hyun Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 197 days.

(21) Appl. No.: 13/157,542

(22) Filed: Jun. 10, 2011

(65) Prior Publication Data

US 2012/0250293 A1   Oct. 4, 2012

(30) Foreign Application Priority Data

Apr. 4, 2011 (KR) .......................... 10-2011-0030630
May 2, 2011 (KR) .......................... 10-2011-0041496
Jun. 3, 2011 (KR) .......................... 10-2011-0054007

(51) Int. Cl.
     *G09F 13/04* (2006.01)
(52) U.S. Cl.
     USPC ........................................ 362/97.2; 362/97.1
(58) Field of Classification Search
     None
     See application file for complete search history.

(56) References Cited

U.S. PATENT DOCUMENTS

| 6,043,591 | A | 3/2000 | Gleckman | 313/110 |
| 6,074,070 | A | 6/2000 | Sasako | 326/31 |
| 7,165,874 | B2 | 1/2007 | Nagakubo et al. | 362/623 |
| 7,794,829 | B2 | 9/2010 | Wu et al. | 428/323 |
| 2006/0203512 | A1 | 9/2006 | Ko et al. | 362/609 |
| 2007/0086207 | A1* | 4/2007 | Cassarly et al. | 362/600 |

FOREIGN PATENT DOCUMENTS

| GB | 2 172 986 A | 10/1986 |
| JP | 10-177806 A | 6/1998 |
| JP | 3235773 B2 | 9/2001 |
| JP | 2003-043459 A | 2/2003 |
| JP | 2004-288498 A | 10/2004 |
| JP | 2004-354533 A | 12/2004 |
| JP | 2005-050727 A | 2/2005 |
| JP | 4133663 B2 | 6/2008 |
| JP | 2010-225395 A | 10/2010 |
| KR | 10-2006-0078576 A | 7/2006 |
| KR | 10-674850 B1 | 1/2007 |
| KR | 10-2007-0034751 A | 3/2007 |
| KR | 10-2009-0082708 A | 7/2009 |

OTHER PUBLICATIONS

European Search Report dated Dec. 6, 2011 issued in Application No. 11 16 9536.

* cited by examiner

*Primary Examiner* — Britt D Hanley
(74) *Attorney, Agent, or Firm* — KED & Associates, LLP

(57) ABSTRACT

A backlight unit and a display apparatus using the same are disclosed. The backlight unit includes a first reflector, a second reflector and at least one light source disposed between the first reflector and the second reflector. The second reflector includes a specular reflection area and a diffuse reflection area. The specular reflection area occupies about 5 to 50% of an entire area of the second reflector.

22 Claims, 51 Drawing Sheets

OVERLAP AREA

BACKLIGHT UNIT AND DISPLAY APPARATUS USING THE SAME HAVING A REFLECTOR THAT INCLUDES A DIFFUSE REFLECTION AREA

The present application claims the benefit of Korean Patent Application No. P2011-0030630, filed on Apr. 4, 2011, Korean Patent Application No. P2011-0041496, filed on May 2, 2011, and Korean Patent Application No. P2011-0054007, filed on Jun. 3, 2011, which are hereby incorporated by reference as if fully set forth herein.

BACKGROUND OF THE INVENTION

1. Field of the Invention

Embodiments relate to a backlight unit and a display apparatus using the same.

2. Discussion of the Related Art

Generally, representative large-scale display apparatuses include liquid crystal displays (LCDs), plasma display panels (PDPs), etc.

Unlike self-emission type PDPs, LCDs essentially need a separate backlight unit due to absence of self light emitting devices.

Backlight units for use in LCDs are classified into edge type backlight units and direct type backlight units according to positions of light sources. In an edge type backlight unit, light sources are arranged at left and right edges or upper and lower edges of an LCD panel and a light guide plate is provided to uniformly distribute light throughout a surface of the LCD panel, which ensures uniform luminance and enables production of an extremely thin display panel.

A direct type backlight unit is generally applied to displays of 20 inches or more. The direct type backlight unit advantageously has greater light efficiency than the edge type backlight unit owing to a plurality of light sources being arranged below a panel and thus, is mainly used in a large-scale display requiring high luminance.

Conventional edge type or direct type backlight units adopt cold cathode fluorescent lamps (CCFLs) as a light source.

The backlight units using CCFLs, however, have several disadvantages, such as consumption of a great quantity of power because power should always be applied to a CCFL, low color reproduction efficiency of about 70% that of a cathode ray tube (CRT), and environmental pollution due to use of mercury.

Currently, backlight units using light emitting diodes (LEDs) are being studied as a solution to the above described problems.

In the case of backlight units using LEDs, turning on or off a part of an LED array is possible, which can achieve remarkable reduction in power consumption. In particular, RGB LEDs exhibit color reproduction beyond 100% of a color reproduction range proposed by the national television system committee (NTSC) and can provide more vivid images to consumers.

Further, LEDs fabricated through semiconductor processes are environmentally friendly.

Although LCD products using LEDs having the above described advantages have been introduced, these LCD products need expensive drivers, PCBs, etc. because LEDs have a driving mechanism different from conventional CCFLs.

For this reason, LED backlight units are applied only to high-price LCD products at present.

SUMMARY OF THE INVENTION

An object of the present invention is to provide a backlight unit having an air guide defined by a reflector having a specular reflection area and a diffuse reflection area and a display apparatus using the same.

Another object of the present invention is to provide a backlight unit having an air guide defined by a reflector having a plurality of patterns in which concave lines and convex lines are alternately arranged and a display apparatus using the same.

To achieve these objects and other advantages and in accordance with the purpose of the invention, as embodied and broadly described herein, a backlight unit includes a first reflector, a second reflector and at least one light source disposed between the first reflector and the second reflector, wherein the second reflector includes a specular reflection area and a diffuse reflection area, and the specular reflection area occupies about 5 to 50% of an entire area of the second reflector.

The diffuse reflection area may reflect incident light in a Lambertian distribution and/or a Gaussian distribution, and an incidence angle of light incident upon each point of the diffuse reflection area may be about 55 degrees or more with respect to a normal line passing each point.

The diffuse reflection area may include first and second diffuse reflection areas, the first and second diffuse reflection areas may reflect incident light in a Lambertian distribution and/or a Gaussian distribution, an incidence angle of light incident upon each point of the first diffuse reflection area may be about 55 degrees or more with respect to a normal line passing each point, and an incidence angle of light incident upon each point of the second diffuse reflection area may be about 60 degrees or more with respect to a normal line passing each point.

The first diffuse reflection area may be configured so that a quantity of light reflected in the Gaussian distribution is greater than a quantity of light reflected in the Lambertian distribution, and the second diffuse reflection area may be configured so that a quantity of light reflected in the Lambertian distribution is greater than a quantity of light reflected in the Gaussian distribution.

A size ratio of the first diffuse reflection area to the second diffuse reflection area may be 1:1 to 5, a size ratio of the specular reflection area to the first diffuse reflection area may be 1:1 to 4, and a size ratio of the specular reflection area to the second diffuse reflection area is 1:1 to 20.

Each of the first and second diffuse reflection areas may include a first layer formed of polyethylene terephthalate (PET) and a second layer formed on the first layer, the second layer being formed of $TiO_2$ and/or $SiO_2$ particles.

Particle weight contained in the first diffuse reflection area may be less than particle weight contained in the second diffuse reflection area.

The second reflector may include an inclined surface having at least one inflection point and may have a pattern in which concave lines and convex lines are alternately arranged along the inclined surface.

The concave lines of the second reflector may be concavely curved from the inclined surface, and the convex lines of the second reflector may be convexly curved from the inclined surface.

Each of the concave lines may have a curvature to satisfy a condition that an angle θ between a straight line connecting a contact point between each of the concave lines and the inclined surface and a peak point of each of the concave lines and the inclined surface is about 0.01 to 15 degrees.

The angle may be defined as represented by equation 1.

$$\theta = \tan^{-1}(h/W) = 0.01 \text{ to } 15 \text{ degrees} \qquad \text{Equation 1}$$

where, h indicates a maximum depth of each of the concave lines (a minimum distance between the peak point of each of the concave lines and the inclined surface) and W indicates a width of each of the concave lines (a minimum distance between the contact point between each of the concave lines and the inclined surface and a vertical line connecting the peak point of each of the concave lines and the inclined surface).

BRIEF DESCRIPTION OF THE DRAWINGS

Arrangements and embodiments may be described in detail with reference to the following drawings in which like reference numerals refer to like elements and wherein.

DETAILED DESCRIPTION OF THE INVENTION

Reference will now be made in detail to the preferred embodiments of the present invention, examples of which are illustrated in the accompanying drawings.

It will be understood that when an element is referred to as being 'on' or 'under' another element, it can be directly on/under the element, and one or more intervening elements may also be present. When an element is referred to as being 'on' or 'under', 'under the element' as well as 'on the element' can be included based on the element.

Figure 1A:
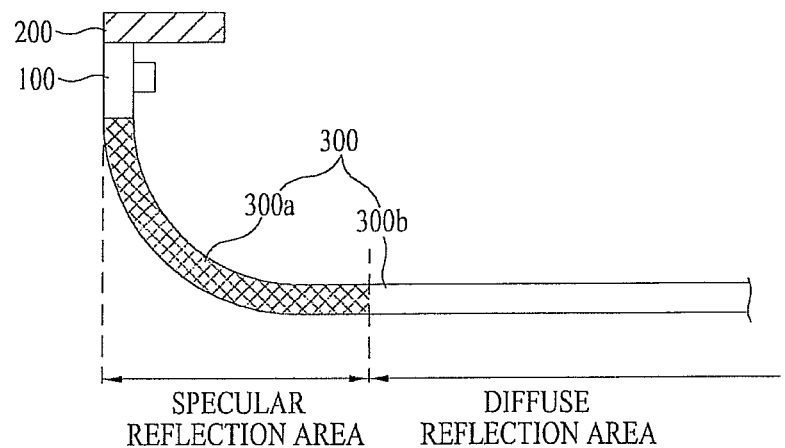
FIGS. 1A and 1B are views explaining a backlight unit according to an embodiment.
Figure 1B:
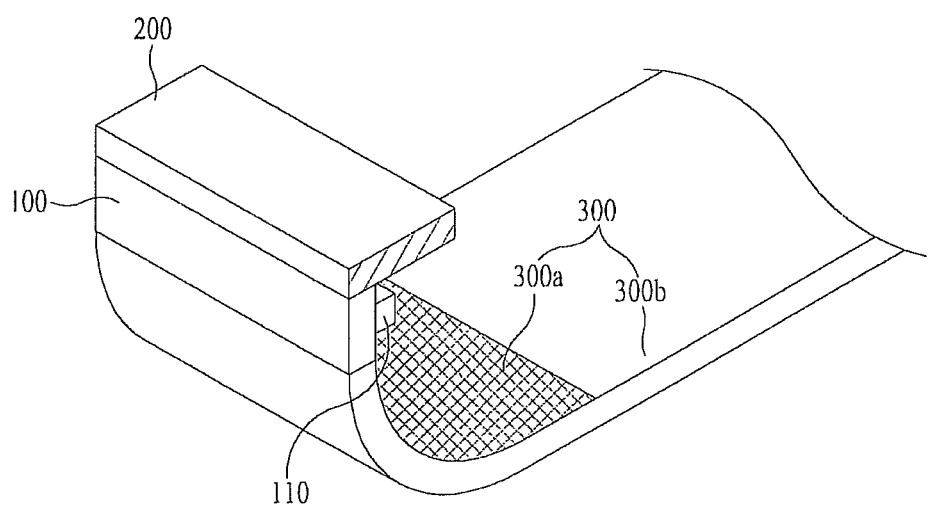

FIGS. 1A and 1B are views explaining a backlight unit according to an embodiment. FIG. 1A is a sectional view of the backlight unit and FIG. 1B is a top perspective view of the backlight unit.

As shown in FIGS. 1A and 1B, the backlight unit may include a light source module 100 including at least one light source 110, a first reflector 200 and a second reflector 300.

The light source module 100, including the light source 110, may be located between the first reflector 200 and the second reflector 300 and may be adjacent to the first reflector 200 or the second reflector 300.

According to circumstances, the light source module 100 may come into contact with the first reflector 200 while being spaced apart from the second reflector 300 by a predetermined distance, or may come into contact with the second reflector 300 while being spaced apart from the first reflector 200 by a predetermined distance.

Alternatively, the light source module 100 may be spaced apart from both the first reflector 200 and the second reflector 300 by a predetermined distance, or may come into contact with both the first reflector 200 and the second reflector 300.

The light source module 100 may include a circuit board having an electrode pattern and light emitting devices to generate light.

In this case, at least one light emitting device may be mounted on the circuit board and the electrode pattern formed on the circuit board may connect the light emitting device to a power supply adaptor.

For example, a carbon nanotube electrode pattern may be formed on an upper surface of the circuit board so as to connect the light emitting device and the adaptor to each other.

The circuit board may be a Printed Circuit Board (PCB) made of polyethylene terephthalate (PET), glass, polycarbonate (PC), silicon (Si) or the like, on which a plurality of light emitting devices is mounted, or may take the form of a film.

The circuit board may be selected from among a single-layer PCB, a multi-layer PCB, a ceramic board, a metal core PCB, and the like.

The light emitting device may be a light emitting diode (LED) chip. The LED chip may be a blue LED chip or ultraviolet (UV) LED chip, or may be a package combining at least one or more selected from among a red LED chip, green LED chip, blue LED chip, yellow green LED chip, white LED chip and UV LED chip.

A white LED may be realized by coupling a yellow phosphor to a blue LED, coupling both red and green phosphors to a blue LED, or coupling yellow, red and green phosphors to a blue LED.

The first reflector 200 and the second reflector 300 may be spaced apart from each other by a predetermined distance so as to face each other so that an air guide is defined in a gap between the first reflector 200 and the second reflector 300 without a conventional light guide plate.

The first reflector 200 may be made of a reflective coating film or a reflective coating material layer and may serve to reflect light emitted from the light source module 100 toward the second reflector 300.

A saw-toothed reflective pattern may be formed on a surface of the first reflector 200 facing the light source module 100. The reflective pattern may have a flat surface or a curved surface.

The surface of the first reflector 200 is provided with the reflective pattern so as to reflect light emitted from the light source module 100 toward a central region of the second reflector 300, thereby increasing luminance of a central region of the backlight unit.

The second reflector 300 includes a specular reflection area 300a and a diffuse reflection area 300b.

The specular reflection area 300a may serve to specularly reflect incident light and the diffuse reflection area 300b may serve to diffusely reflect incident light. The specular reflection area 300a and the diffuse reflection area 300b may have a light reflectivity of about 50 to 99.99%.

The specular reflection area 300a may occupy about 5 to 50% of the entire area of the second reflector 300.

Alternatively, the specular reflection area 300a may occupy about 20 to 30% of the entire area of the second reflector 300.

Also, a size ratio of the specular reflection area 300a to the diffuse reflection area 300b of the second reflector 300 may be 1:1 to 20.

The size ratio of the specular reflection area 300a to the diffuse reflection area 300b of the second reflector 300 is set so as to reduce the difference of luminance between an area adjacent to the light source 110 and an area distant from the light source 110.

That is, the size ratio of the specular reflection area 300a to the diffuse reflection area 300b of the second reflector 300 may be properly adjusted to provide overall uniform luminance.

The second reflector 300 may contain a metal or a metal oxide, such as aluminum (Al), silver (Ag), gold (Au) or titanium dioxide (TiO$_2$), exhibiting high reflectivity. The specular reflection area 300a and the diffuse reflection area 300b of the second reflector 300 may be formed of different materials. Also, the specular reflection area 300a and the diffuse reflection area 300b of the second reflector 300 may have different surface roughnesses.

That is, the specular reflection area 300a and the diffuse reflection area 300b of the second reflector 300 may be formed of the same material while having different surface roughnesses.

Alternatively, the specular reflection area 300a and the diffuse reflection area 300b of the second reflector 300 may be formed of different materials while having different surface roughnesses.

The light source 110 and/or the first reflector 200 may overlap with the specular reflection area 300a.

That is, the first reflector 200 may partially or fully overlap with the specular reflection area 300a of the second reflector 300.

The specular reflection area 300a of the second reflector 300 may be located adjacent to the light source module 100 to reflect light emitted from the light source 110 to a central region of the second reflector 300. The diffuse reflection area 300b of the second reflector 300 may be located at the central region of the second reflector 300 to diffuse incident light.

Also, the second reflector 300 may include at least one inclined surface and at least one flat surface.

The inclined surface of the second reflector 300 may be at a predetermined angle to the first reflector 200. The flat surface of the second reflector 300 may be parallel to the first reflector 200.

The specular reflection area may be fully or partially formed at the inclined surface of the second reflector 300. The inclined surface of the second reflector 300 may overlap with the light source 110 and/or the first reflector 200.

Figure 2A:
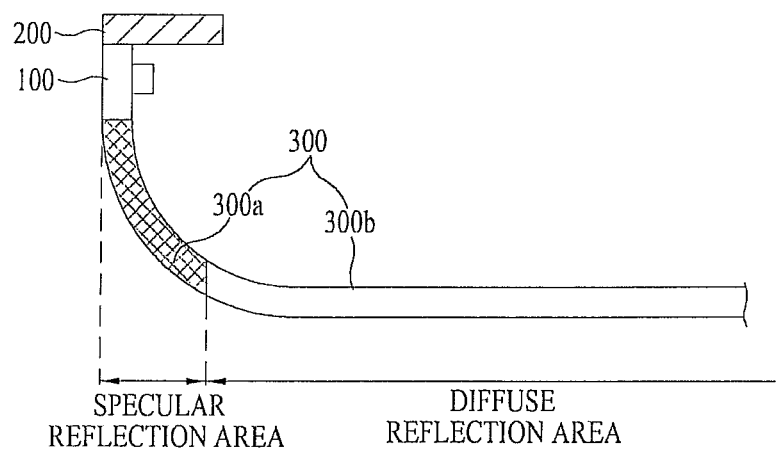
FIGS. 2A and 2B are views showing a first reflector overlapping with a specular reflection area of a second reflector.
Figure 2B:
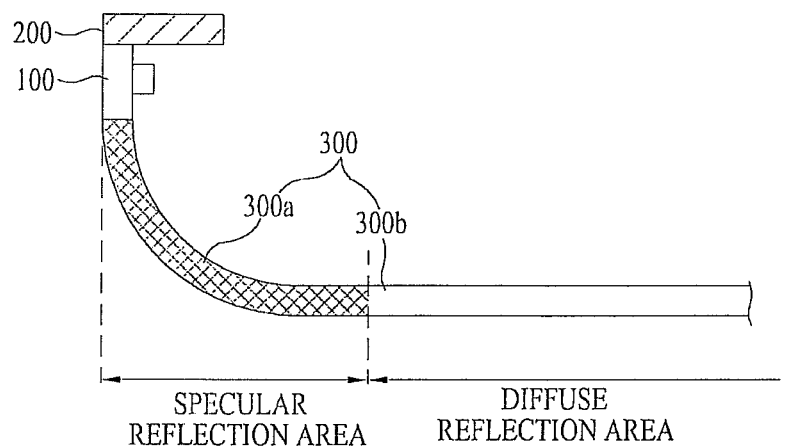

FIGS. 2A and 2B are views showing the first reflector overlapping with the specular reflection area of the second reflector. FIG. 2A is a view showing the first reflector partially overlapping with the specular reflection area of the second reflector. FIG. 2B is a view showing the first reflector fully overlapping with the specular reflection area of the second reflector.

As shown in FIG. 2A, the first reflector 200 may partially overlap with the specular reflection area 300a of the second reflector 300.

The light source 110 may be partially or fully overlap with the specular reflection area 300a of the second reflector 300.

As shown in FIG. 2B, the first reflector 200 may fully overlap with the specular reflection area 300a of the second reflector 300.

The light source 110 may be partially or fully overlap with the specular reflection area 300a of the second reflector 300.

Figure 3A:
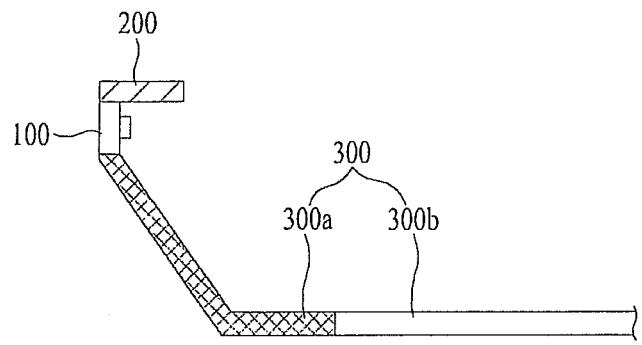
FIGS. 3A to 3C are views showing a second reflector including an inclined surface and a flat surface.
Figure 3B:
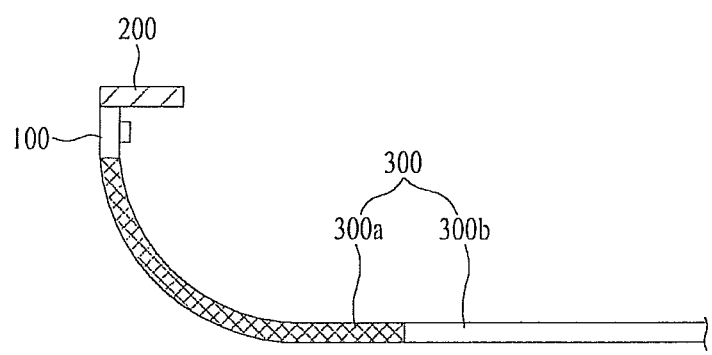
Figure 3C:
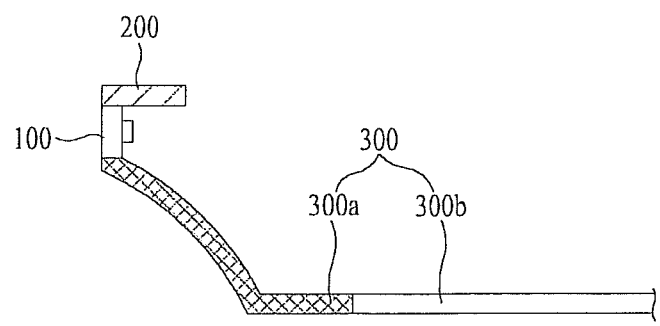

FIGS. 3A to 3C are views showing the second reflector including the inclined surface and the flat surface.

In FIG. 3A, the inclined surface may have a planar surface and may be included in the specular reflection area 300a of the second reflector 300.

In FIG. 3B, the inclined surface may have a concavely curved surface and may be included in the specular reflection area 300a of the second reflector 300. In FIG. 3C, the inclined surface may have a convexly curved surface and may be included in the specular reflection area 300a of the second reflector 300.

As shown in FIGS. 3A to 3C, the flat surface of the second reflector 300 parallel to the first reflector 200 may be included in the diffuse reflection area 300b of the second reflector 300.

Meanwhile, the second reflector 300 may include at least two inclined surfaces having at least one inflection point. The first and second inclined surfaces adjacent to each other about the inflection point may have different curvatures.

Figure 4A:
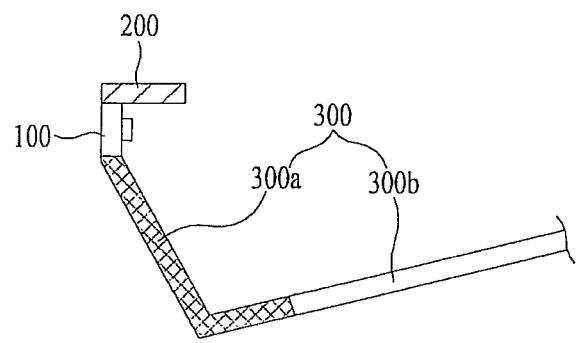
FIGS. 4A to 4C are views showing a second reflector including a plurality of inclined surfaces.
Figure 4B:
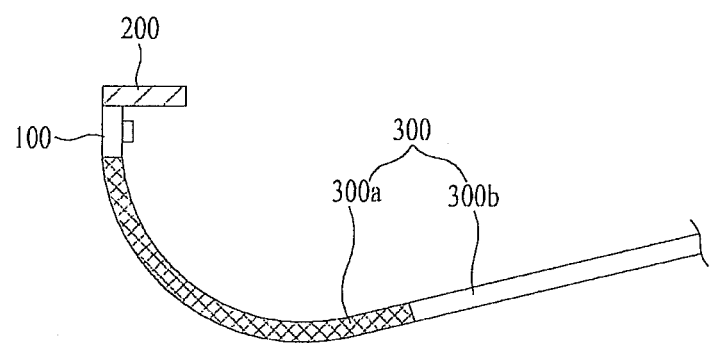
Figure 4C:
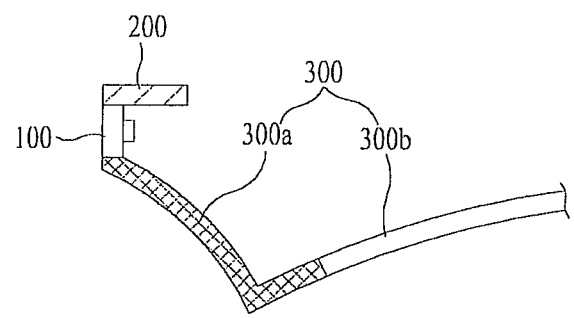

FIGS. 4A to 4C are views showing a second reflector including a plurality of inclined surfaces.

Referring to FIG. 4A, two inclined surfaces adjacent to each other have planar surfaces. One of the inclined surfaces may be included in the specular reflection area 300a of the second reflector 300 and the other inclined surface may be included in the diffuse reflection area 300b of the second reflector 300.

According to circumstances, the other inclined surface may be partially included in the specular reflection area 300a of the second reflector 300.

Referring to FIG. 4B, two inclined surfaces adjacent to each other have concavely curved surfaces. The two inclined surfaces may have different curvatures. Referring to FIG. 4C, two inclined surfaces adjacent to each other have convexly curved surfaces. The two inclined surfaces may have different curvatures.

One of the inclined surfaces may be included in the specular reflection area 300a of the second reflector 300 and the other inclined surface may be included in the diffuse reflection area 300b of the second reflector 300.

According to circumstances, the other inclined surface may be partially included in the specular reflection area 300a of the second reflector 300.

The inclined surface of the second reflector 300 may be at least one selected from among a concave surface, a convex surface and a flat surface.

Meanwhile, the second reflector 300 may be a single layer or a double layer.

That is, the second reflector 300 may be a single layer including a specular reflection area 300a and a diffuse reflection area 300b. Alternatively, the second reflector 300 may be configured to have a double layer including a diffuse reflection layer and a specular reflection layer formed on the diffuse reflection layer so that the diffuse reflection layer is partially exposed.

Figure 5:
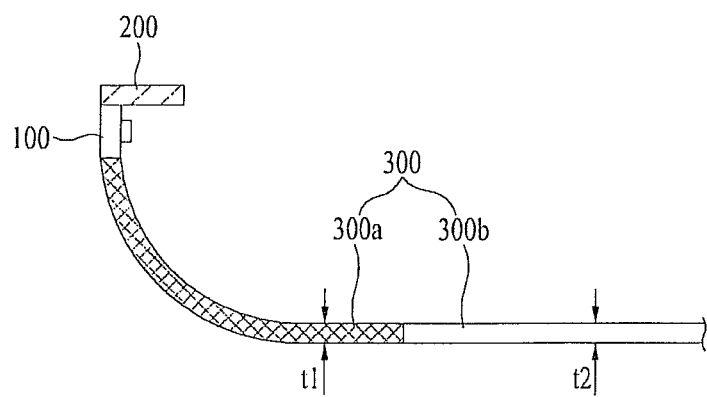
FIG. 5 is a sectional view showing a second reflector of a single layer structure according to a first embodiment.

FIG. 5 is a sectional view showing a second reflector of a single layer structure according to a first embodiment. In FIG. 5, the specular reflection area 300a and the diffuse reflection area 300b of the second reflector 300 do not overlap with each other.

As shown in FIG. 5, a specular reflection layer may be formed at the specular reflection area 300a of the second reflector 300 and a diffuse reflection layer may be formed at the diffuse reflection area 300b of the second reflector 300.

The specular reflection layer and the diffuse reflection layer may be arranged on the same plane. The thickness t1 of the specular reflection layer may be equal to the thickness t2 of the diffuse reflection layer.

The specular reflection layer and the diffuse reflection layer may contain a metal or a metal oxide, such as aluminum (Al), silver (Ag), gold (Au) or titanium dioxide ($TiO_2$), exhibiting high reflectivity. The specular reflection layer and the diffuse reflection layer may be formed of the same material or different materials. Also, the specular reflection layer and the diffuse reflection layer may have different surface roughnesses.

The specular reflection layer and the diffuse reflection layer may be configured by attaching a reflective film to a mold body or may be a mold body having a specular reflection surface or a diffuse reflection surface.

According to circumstances, the specular reflection layer and the diffuse reflection layer may be formed of a copolymer resin, such as plastic, by injection molding.

The reflective film may contain a metal and/or a metal oxide. For example, the reflective layer may contain a metal or a metal oxide, such as aluminum (Al), silver (Ag), gold (Au) or titanium dioxide ($TiO_2$), exhibiting high reflectivity.

A bonding agent or coupling member is formed at the interface between the specular reflection area 300a having the specular reflection layer and the diffuse reflection area 300b having the diffuse reflection layer to connect the specular reflection area 300a and the diffuse reflection area 300b to each other.

The size percentage of the specular reflection area 300a of the second reflector 300 may decrease as the specular reflection area 300a becomes distant from the light source module 100.

FIGS. 6A to 6D are plan views showing various shapes of a second reflector having a specular reflection area, the size of which decreases as the specular reflection area becomes distant from a light source module.

Figure 6A:
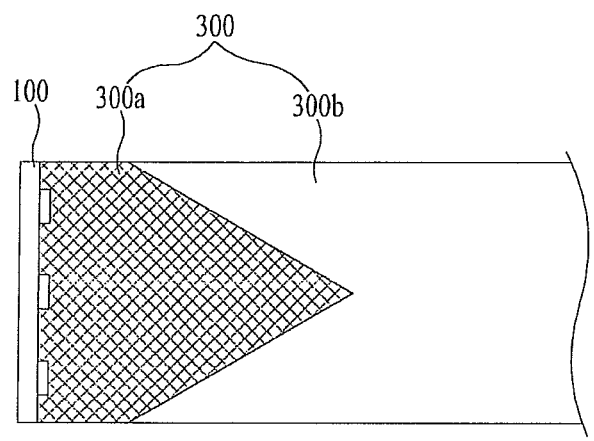
FIGS. 6A to 6D are plan views showing various shapes of a second reflector having a specular reflection area, the size of which decreases as the specular reflection area becomes distant from a light source module.
Figure 6B:
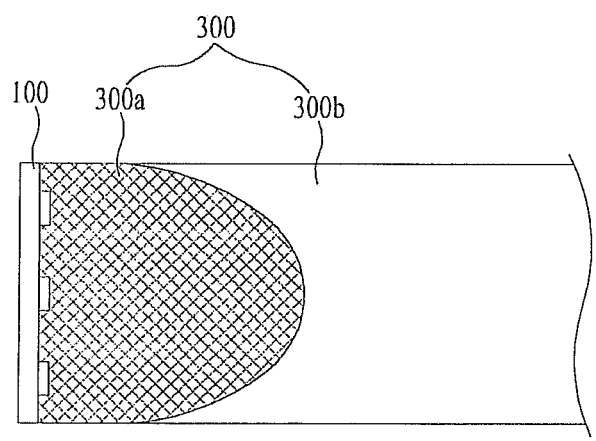
Figure 6C:
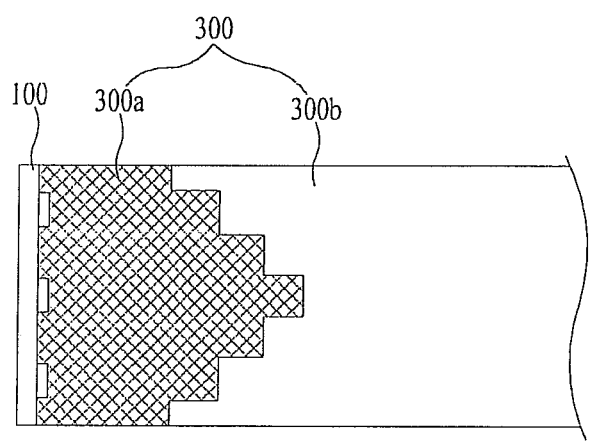
Figure 6D:
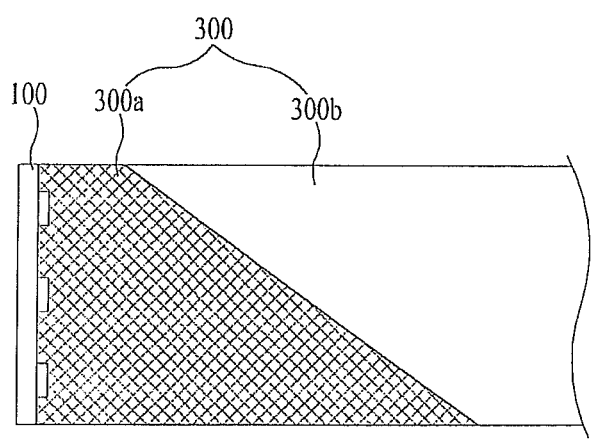

In FIG. 6A, the specular reflection area 300a of the second reflector 300 may have a triangular shape. In FIG. 6B, the specular reflection area 300a of the second reflector 300 may have a semicircular shape. In FIG. 6C, the specular reflection area 300a of the second reflector 300 may have a stepwise shape. In FIG. 6D, the specular reflection area 300a of the second reflector 300 may have a slant line.

As shown in FIGS. 6A to 6D, the size of the specular reflection area 300a of the second reflector 300 may gradually decrease as the specular reflection area 300a becomes distant from the light source module 100.

On the other hand, the size of the diffuse reflection area 300b of the second reflector 300 may gradually increase as the diffuse reflection area 300b becomes distant from the light source module 100.

The specular reflection area 300a of the second reflector 300 may occupy about 20 to 30% of the entire area of the second reflector 300.

According to circumstances, a size ratio of the specular reflection area 300a to the diffuse reflection area 300b of the second reflector 300 may be about 1:1 to 20.

The specular reflection area 300a of the second reflector 300 is formed so that the size percentage of the specular reflection area 300a of the second reflector 300 decreases as the specular reflection area 300a becomes distant from the light source module 100 so as to remove black lines from the boundary between the specular reflection area 300*a* and the diffuse reflection area 300*b*, thereby providing uniform luminance.

In another embodiment, the specular reflection area 300*a* of the second reflector 300 may include a first area adjacent to the light source module 100 and a second area distant from the light source module 100. The specular reflection area 300*a* of the second reflector 300 adjacent to the light source module 100 may have a size greater than that of the specular reflection area 300*a* of the second reflector 300 distant from the light source module 100.

Figure 7A:
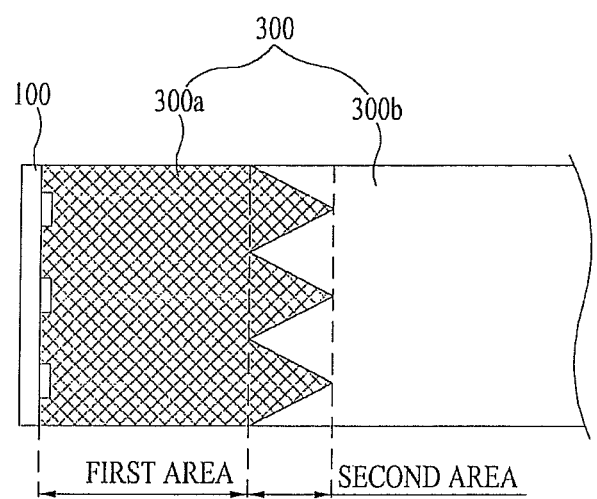
FIGS. 7A to 7C are plan views showing various shapes of a second reflector having a specular reflection area, the size of which varies depending upon distance from a light source module.
Figure 7B:
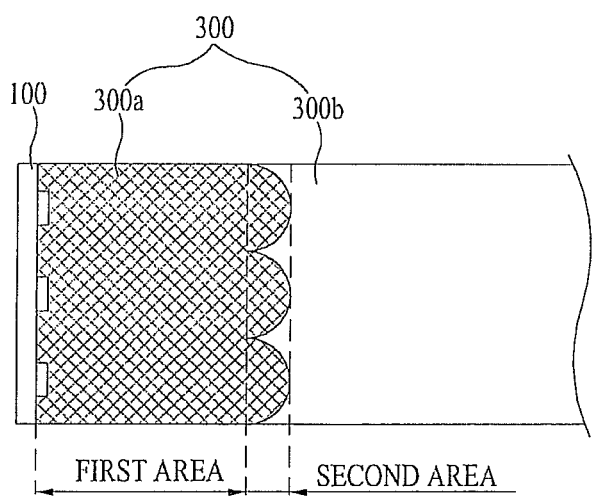
Figure 7C:
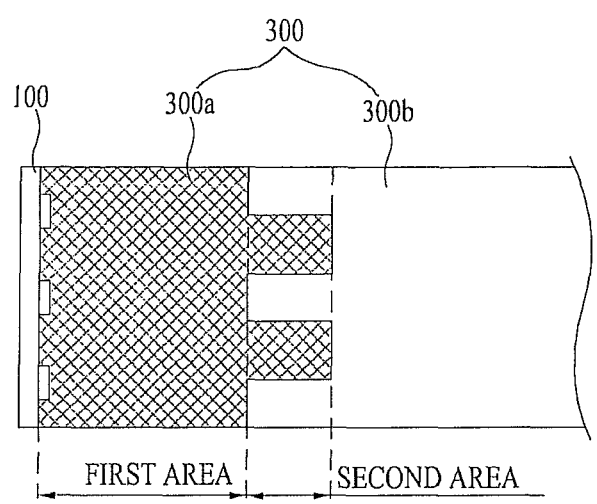

FIGS. 7A to 7C are plan views showing various shapes of a second reflector having a specular reflection area, the size of which varies depending upon distance from the light source module.

In FIG. 7A, the second area of the specular reflection area 300*a* may have triangular shapes. In FIG. 7B, the second area of the specular reflection area 300*a* may have semicircular shapes. In FIG. 7C, the second area of the specular reflection area 300*a* may have square shapes.

As shown in FIGS. 7A to 7C, the specular reflection area 300*a* of the second reflector 300 may include a first area adjacent to the light source module 100 and a second area distant from the light source module 100.

The second area of the specular reflection area 300*a* may have a size less than that of the first area of the specular reflection area 300*a* and may have various shapes, such as triangular shapes, semicircular shapes, square shapes and polygonal shapes.

That is, the size of the second area of the specular reflection area 300*a* may gradually decrease as the second area of the specular reflection area 300*a* becomes distant from the light source module 100.

On the other hand, the size of the second area of the diffuse reflection area 300*b* may gradually increase as the second area of the diffuse reflection area 300*b* becomes distant from the light source module 100.

The specular reflection area 300*a* of the second reflector 300 may occupy about 20 to 30% of the entire area of the second reflector 300.

According to circumstances, a size ratio of the specular reflection area 300*a* to the diffuse reflection area 300*b* of the second reflector 300 may be about 1:1 to 20.

Also, a size ratio of the first area to the second area of the specular reflection area 300*a* of the second reflector 300 may be about 1 to 10:0.4.

The second area of the specular reflection area 300*a* may extend about 5 to 200 mm from the first area of the specular reflection area 300*a*.

Figure 8:
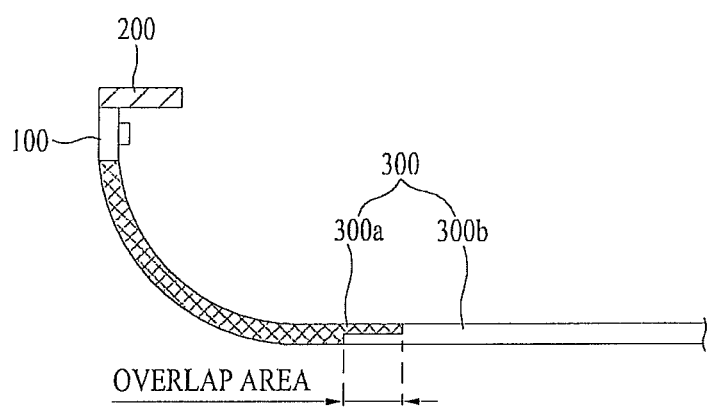
FIG. 8 is a sectional view showing a second reflector of a single layer structure according to a second embodiment.

FIG. 8 is a sectional view showing a second reflector of a single layer structure according to a second embodiment. In FIG. 8, the specular reflection area 300*a* and the diffuse reflection area 300*b* of the second reflector 300 overlap with each other.

As shown in FIG. 8, a specular reflection layer may be formed at the specular reflection area 300*a* of the second reflector 300 and a diffuse reflection layer may be formed at the diffuse reflection area 300*b* of the second reflector 300. The specular reflection layer and the diffuse reflection layer may be formed at the overlap area in an overlapping fashion.

The overlap area may have a structure in which the specular reflection layer is deposited on the diffuse reflection layer. The overall thickness of the overlap area may be substantially equal to the thickness of the specular reflection area 300*a* of the second reflector 300 and the thickness of the diffuse reflection area 300*b*.

According to circumstances, the overall thickness of the overlap area may be different from the thickness of the specular reflection area 300*a* of the second reflector 300 and/or the thickness of the diffuse reflection area 300*b*.

Also, although not shown, the overlap area may have a structure in which the diffuse reflection layer is deposited on the specular reflection layer.

The specular reflection layer and the diffuse reflection layer of the second reflector 300 may be arranged on the same plane. The specular reflection layer and the diffuse reflection layer may partially overlap with each other.

FIGS. 9A to 9D are sectional views showing various shapes of the overlap area of FIG. 8.

Figure 9A:
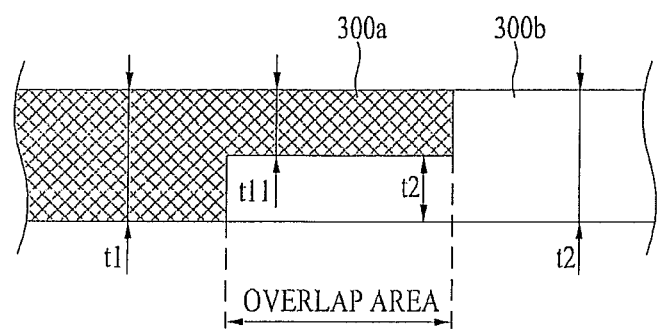
FIGS. 9A to 9D are sectional views showing various shapes of an overlap area of FIG. 8.
Figure 9B:
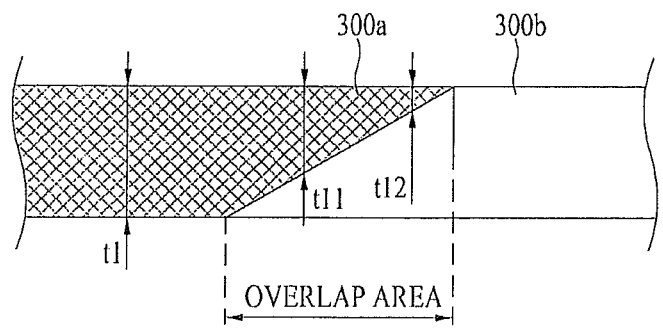
Figure 9C:
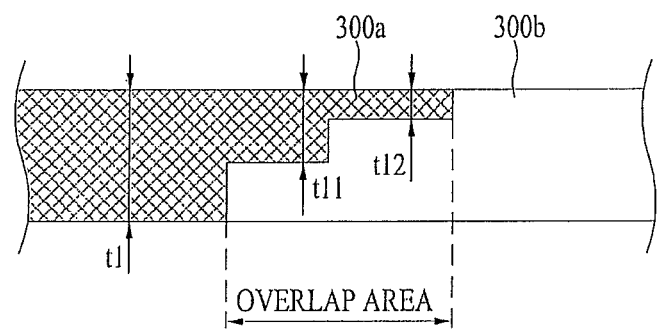
Figure 9D:
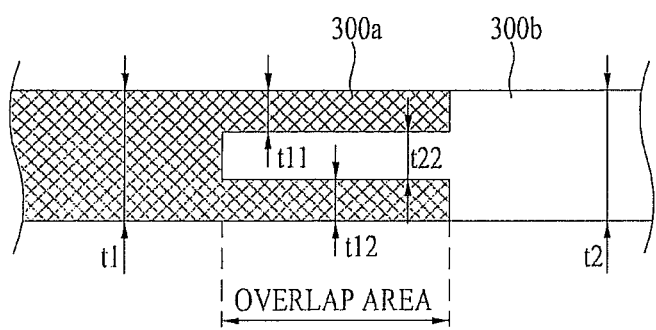

In FIGS. 9A and 9D, the thickness of the specular reflection layer of the overlap area is uniform. Referring to FIGS. 9A and 9D, the thickness of the specular reflection layer of the overlap area is uniform. In FIGS. 9B and 9C, the thickness of the specular reflection layer of the overlap area gradually decreases.

As shown in FIGS. 9A to 9D, the overlap area may have a structure in which the specular reflection layer and the diffuse reflection layer overlap with each other. The thickness t11 of the specular reflection layer overlapping with the diffuse reflection layer may be less than the thickness t1 of the specular reflection layer not overlapping with the diffuse reflection layer.

More specifically, as shown in FIG. 9A, the thickness t11 of the specular reflection layer formed at the overlap area may be less than the thickness t1 of the specular reflection layer formed at the specular reflection area 300*a*. Also, the thickness t22 of the diffuse reflection layer formed at the overlap area may be less than the thickness t2 of the diffuse reflection layer formed at the diffuse reflection area 300*b*.

The thickness t11 of the specular reflection layer formed at the overlap area may be uniform within the overlap area and may be equal to the thickness t22 of the diffuse reflection layer formed at the overlap area.

According to circumstances, however, the thickness t11 of the specular reflection layer formed at the overlap area may be greater than or less than the thickness t22 of the diffuse reflection layer formed at the overlap area.

As shown in FIG. 9B, the thicknesses t11 and t12 of the specular reflection layer formed at the overlap area may be less than the thickness t1 of the specular reflection layer formed at the specular reflection area 300*a*.

The thicknesses t11 and t12 of the specular reflection layer formed at the overlap area may gradually decrease as the specular reflection layer becomes distant from the light source module.

That is, the specular reflection layer formed at the overlap area may gradually decrease from the thickness t11 of the area adjacent to the light source module to the thickness t12 of the area distant from the light source module.

As shown in FIG. 9C, the thicknesses t11 and t12 of the specular reflection layer formed at the overlap area may be less than the thickness t1 of the specular reflection layer formed at the specular reflection area 300*a*.

The thicknesses t11 and t12 of the specular reflection layer formed at the overlap area may stepwise decrease as the specular reflection layer becomes distant from the light source module.

That is, the specular reflection layer formed at the overlap area may decrease from the thickness t11 of the area adjacent to the light source module to the thickness t12 of the area distant from the light source module.

As shown in FIG. 9D, the overlap area may have a structure in which the diffuse reflection layer is disposed in the specular reflection layer.

Within the overlap area, the thickness t11 of the specular reflection layer on the diffuse reflection layer and the thickness t12 of the specular reflection layer under the diffuse reflection layer may be less than the thickness t1 of the specular reflection layer formed at the specular reflection area 300a. Also, the thickness t22 of the diffuse reflection layer formed at the overlap area may be less than the thickness t2 of the diffuse reflection layer formed at the diffuse reflection area 300b.

The thicknesses t11 and t12 of the specular reflection layer formed at the overlap area may be uniform within the overlap area and may be equal to the thickness t22 of the diffuse reflection layer formed at the overlap area.

According to circumstances, however, the thicknesses t11 and t12 of the specular reflection layer formed at the overlap area may be greater than or less than the thickness t22 of the diffuse reflection layer formed at the overlap area.

Figure 10A:
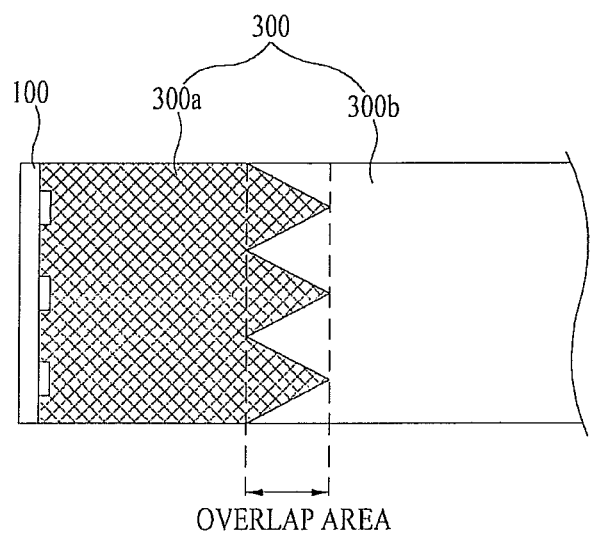
FIGS. 10A to 10C are plan views showing various shapes of a specular reflection layer formed at the overlap area of FIG. 8.
Figure 10B:
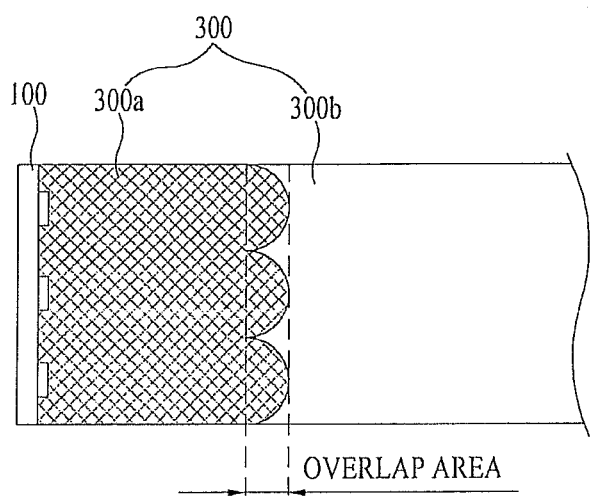
Figure 10C:
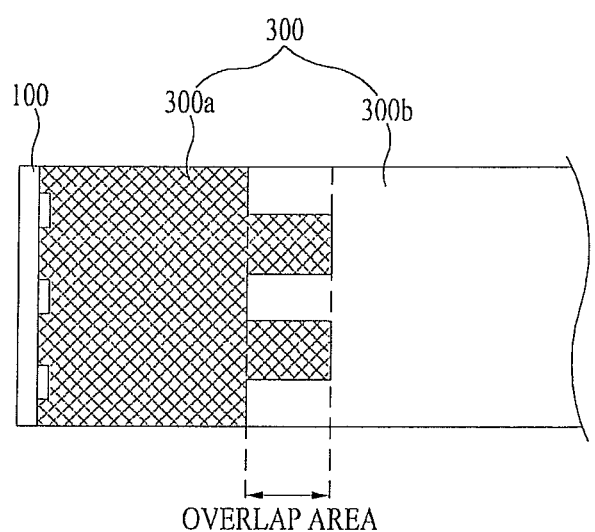

FIGS. 10A to 10C are plan views showing various shapes of the specular reflection layer formed at the overlap area of FIG. 8.

In FIG. 10A, the specular reflection layer of the overlap area may have triangular shapes. In FIG. 103, the specular reflection layer of the overlap area may have semicircular shapes. In FIG. 10C, the specular reflection layer of the overlap area may have square shapes.

As shown in FIGS. 10A to 10C, the second reflector 300 may include an overlap area within which the specular reflection layer of the specular reflection area 300a and the diffuse reflection layer of the diffuse reflection area 300b overlap with each other. The specular reflection layer of the overlap area may have a size less than that of the specular reflection layer of the specular reflection area 300a and may have various shapes, such as triangular shapes, semicircular shapes, square shapes and polygonal shapes.

That is, the size of the specular reflection layer of the overlap area may gradually decrease as the specular reflection layer becomes distant from the light source module 100.

On the other hand, the size of the diffuse reflection layer of the overlap area may gradually increase as the specular reflection layer becomes distant from the light source module 100.

The specular reflection area 300a of the second reflector 300 may occupy about 20 to 30% of the entire area of the second reflector 300.

According to circumstances, a size ratio of the specular reflection area 300a to the diffuse reflection area 300b of the second reflector 300 may be about 1:1 to 20.

Also, a size ratio of the non-overlap area to the overlap area of the specular reflection area 300a of the second reflector 300 may be about 1 to 10:0.4.

The overlap area of the specular reflection area 300a may extend about 5 to 200 mm from the specular reflection area 300a.

Also, at least one hole may be formed at the specular reflection layer of the overlap area so that the diffuse reflection layer is partially exposed.

Figure 11:
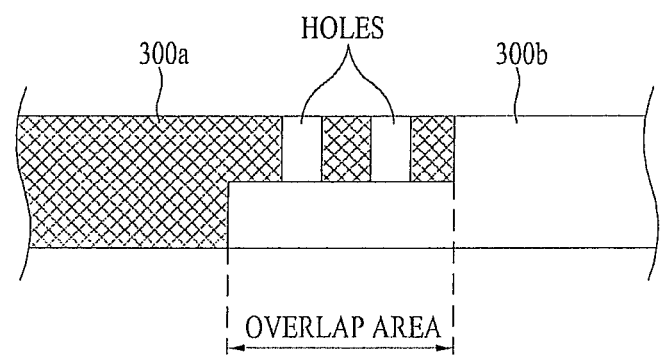
FIG. 11 is a sectional view showing holes of the specular reflection layer formed at the overlap area of FIG. 8.

FIG. 11 is a sectional view showing holes of the specular reflection layer formed at the overlap area of FIG. 8.

Figure 12A:
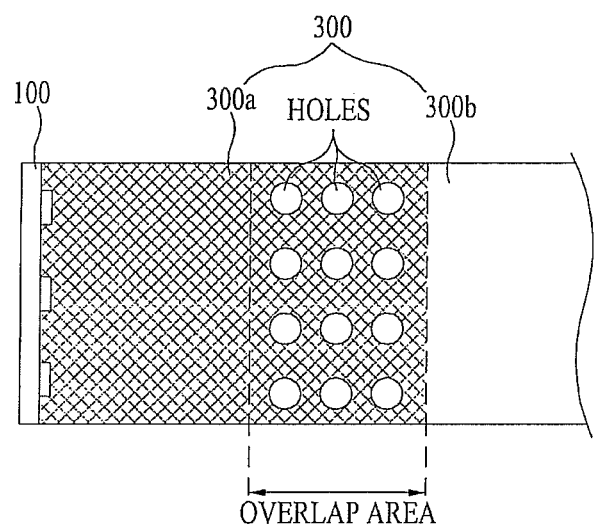
FIGS. 12A and 12B are plan views showing the holes of the specular reflection layer formed at the overlap area of FIG. 8.
Figure 12B:
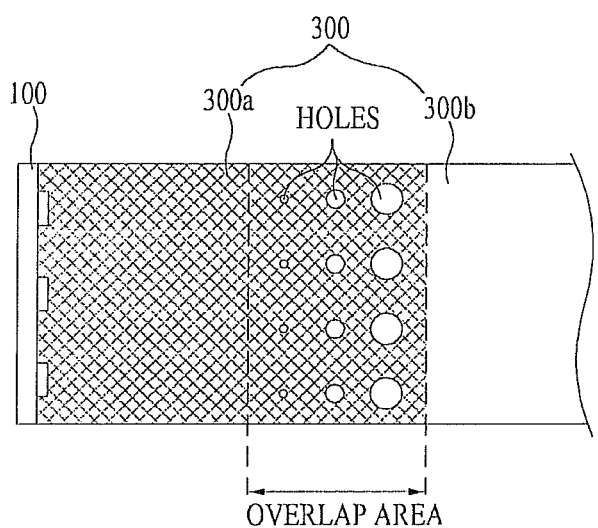

FIGS. 12A and 12B are plan views showing the holes of the specular reflection layer formed at the overlap area of FIG. 8.

As shown in FIG. 11, a plurality of holes may be formed at the specular reflection layer, formed on the diffuse reflection layer, of the overlap area so that the diffuse reflection layer is partially exposed.

The number of holes formed at the specular reflection layer may increase as the holes become distant from the light source module.

The holes formed at the specular reflection layer may have the same size. According to circumstances, the holes formed at the specular reflection layer may have different sizes.

As shown in FIG. 12A, the holes formed at the overlap area may have the same size. As shown in FIG. 12B, the holes formed at the overlap area may have different sizes.

If the holes formed at the overlap area may have different sizes, the size of the holes may increase as the holes become distant from the light source module 100.

Also, the number of the holes formed at the overlap area may increase as the holes become distant from the light source module 100 irrespective of the size thereof.

The holes are formed at the overlap area of the second reflector so that the size of the specular reflection area 300a decreases as the specular reflection area 300a becomes distant from the light source module 100, thereby providing uniform luminance.

The specular reflection layer formed at the specular reflection area of the second reflector and the diffuse reflection layer formed at the diffuse reflection area of the second reflector may be configured by attaching a reflective film to a mold body or may be a mold body having a specular reflection surface or a diffuse reflection surface.

According to circumstances, the specular reflection layer and the diffuse reflection layer may be formed of a copolymer resin, such as plastic, by injection molding.

The reflective film may contain a metal and/or a metal oxide. For example, the reflective layer may contain a metal or a metal oxide, such as aluminum (Al), silver (Ag), gold (Au) or titanium dioxide ($TiO_2$), exhibiting high reflectivity.

A bonding agent or coupling member is formed between the specular reflection area having the specular reflection layer and the diffuse reflection area having the diffuse reflection layer to connect the specular reflection area and the diffuse reflection area to each other.

Figure 13:
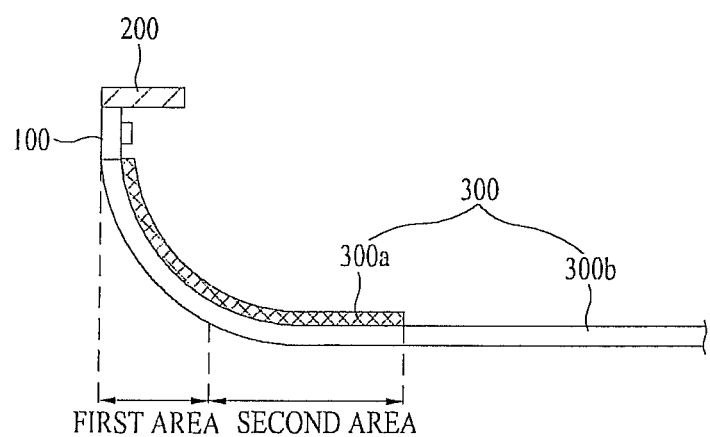
FIG. 13 is a sectional view showing a second reflector of a double layer structure.

FIG. 13 is a sectional view showing a second reflector of a double layer structure.

As shown in FIG. 13, the second reflector 300 is configured to have a structure in which the specular reflection area 300a and the diffuse reflection area 300b overlap with each other.

The second reflector 300 may have a double layer including a diffuse reflection layer and a specular reflection layer formed on the diffuse reflection layer so that the diffuse reflection layer is partially exposed.

That is, the specular reflection area 300a of the second reflector 300 has a structure in which the specular reflection layer is formed on the diffuse reflection layer, and the diffuse reflection area 300b of the second reflector 300 has a structure in which the diffuse reflection layer is exposed.

The specular reflection area 300a of the second reflector 300 may occupy about 20 to 30% of the entire area of the second reflector 300. According to circumstances, a size ratio of the specular reflection area 300a to the diffuse reflection area 300b of the second reflector 300 may be 1:1 to 20.

The specular reflection area 300a may include a first area adjacent to the light source module 100 and a second area distant from the light source module 100. The second area may have a size less than that of the first area.

A size ratio of the first area to the second area of the specular reflection area 300a of the second reflector 300 may be about 1 to 10:0.4.

Also, the thickness of the specular reflection layer formed at the second area of the specular reflection area 300a of the second reflector 300 may be equal to or different from that of the specular reflection layer formed at the first area of the specular reflection area 300a of the second reflector 300.

Figure 14A:
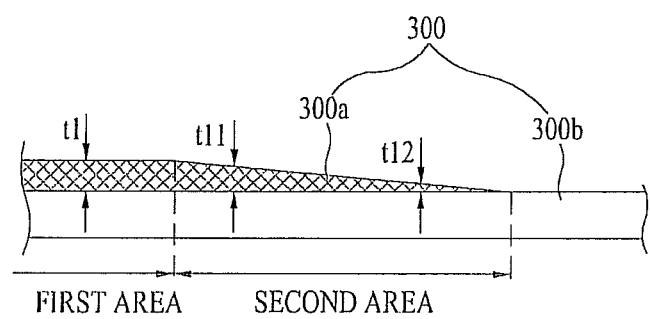
FIGS. 14A and 14B are sectional views showing thicknesses of a specular reflection layer of FIG. 13.
Figure 14B:
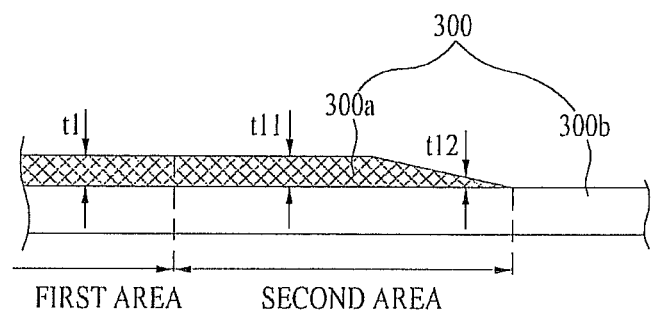

FIGS. 14A and 14B are sectional views showing thicknesses of the specular reflection area of FIG. 13.

In FIG. 14A, the thickness of the specular reflection layer formed at the second area gradually decreases as the specular reflection layer becomes distant from the light source module (not shown). In FIG. 14B, the thickness of the specular reflection layer formed at the second area remains uniform and then gradually decreases as the specular reflection layer becomes distant from the light source module (not shown).

As shown in FIG. 14A, the thicknesses t11 and t12 of the specular reflection layer formed at the second area of the specular reflection area 300a may be less than the thickness t1 of the specular reflection layer formed at the first area of the specular reflection area 300a.

The thicknesses t11 and t12 of the specular reflection layer formed at the second area may gradually decrease as the specular reflection layer becomes distant from the light source module.

That is, the specular reflection layer formed at the second area may gradually decrease from the thickness t11 of the area adjacent to the light source module to the thickness t12 of the area distant from the light source module.

As shown in FIG. 14B, the thicknesses t11 and t12 of the specular reflection layer formed at the second area of the specular reflection area 300a may be equal to the thickness t1 of the specular reflection layer formed at the first area of the specular reflection area 300a and then may gradually decrease.

That is, the specular reflection layer formed at the second area may decrease from the thickness t11 of the area adjacent to the light source module to the thickness t12 of the area distant from the light source module.

The thickness of the specular reflection layer formed at the second area is reduced so as to reduce abrupt change of luminance at the boundary between the specular reflection area 300a and the diffuse reflection area 300b.

Also, a plurality of holes may be formed at the specular reflection layer formed on the diffuse reflection layer so that the diffuse reflection layer is partially exposed.

Figure 15A:
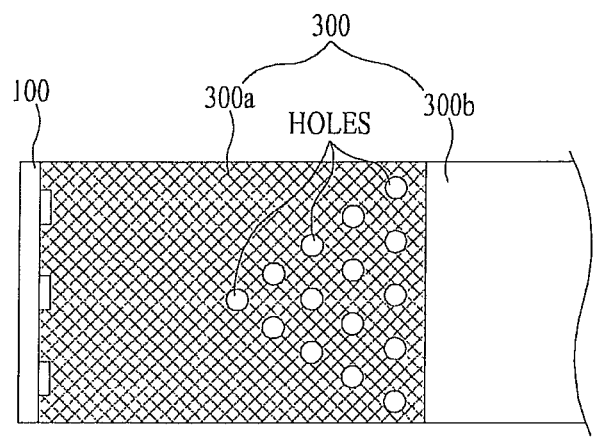
FIGS. 15A and 15B are plan views showing holes formed at the specular reflection area.
Figure 15B:
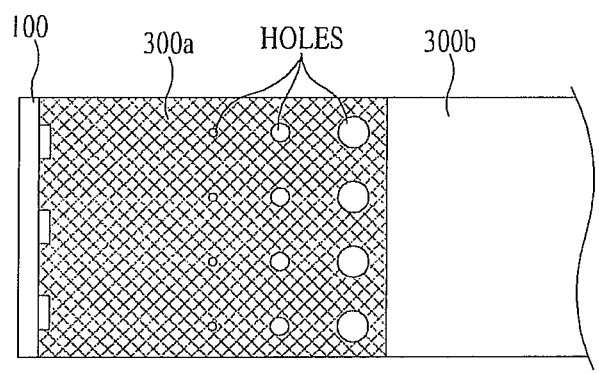

FIGS. 15A and 15B are plan views showing holes formed at the specular reflection area.

In FIG. 15A, the number of holes formed at the specular reflection area 300a may increase as the holes become distant from the light source module 100. In FIG. 15B, the size of holes formed at the specular reflection area 300a may increase as the holes become distant from the light source module 100.

As shown in FIG. 15A, a plurality of holes may be formed at the specular reflection layer, formed on the diffuse reflection layer, of the specular reflection area 300a so that the diffuse reflection layer is partially exposed.

The number of holes formed at the specular reflection layer may increase as the holes become distant from the light source module 100.

Also, the holes formed at the specular reflection layer may have the same size. According to circumstances, the holes formed at the specular reflection layer may have different sizes.

That is, both the number and size of the holes formed at the specular reflection layer may increase as the holes become distant from the light source module 100.

As shown in FIG. 15B, a plurality of holes may be formed at the specular reflection layer, formed on the diffuse reflection layer, of the specular reflection area 300a so that the diffuse reflection layer is partially exposed.

The size of holes formed at the specular reflection layer may increase as the holes become distant from the light source module 100.

Also, the holes formed at the specular reflection layer may have the same number. According to circumstances, the holes formed at the specular reflection layer may have different numbers.

That is, both the number and size of the holes formed at the specular reflection layer may increase as the holes become distant from the light source module 100.

The holes are formed at the specular reflection area 300a of the second reflector 300 so that the size percentage of the specular reflection area 300a decreases as the specular reflection area 300a becomes distant from the light source module 100, thereby providing uniform luminance.

The specular reflection area 300a may include a first area adjacent to the light source module 100 and a second area distant from the light source module 100. The second area may have a size less than that of the first area.

Figure 16A:
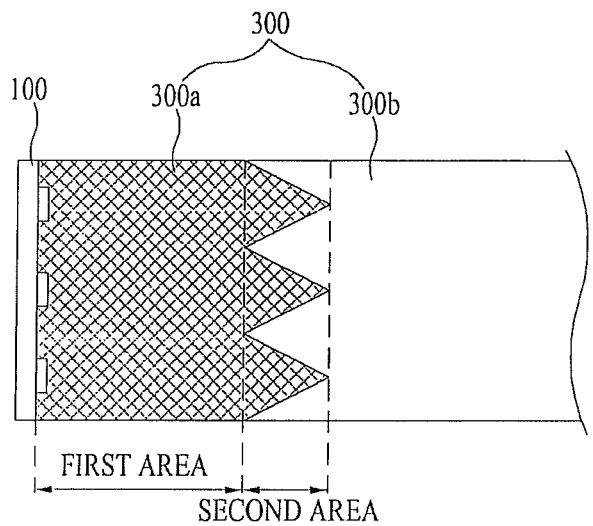
FIGS. 16A to 16C are plan views showing various shapes of a second area of the specular reflection area.
Figure 16B:
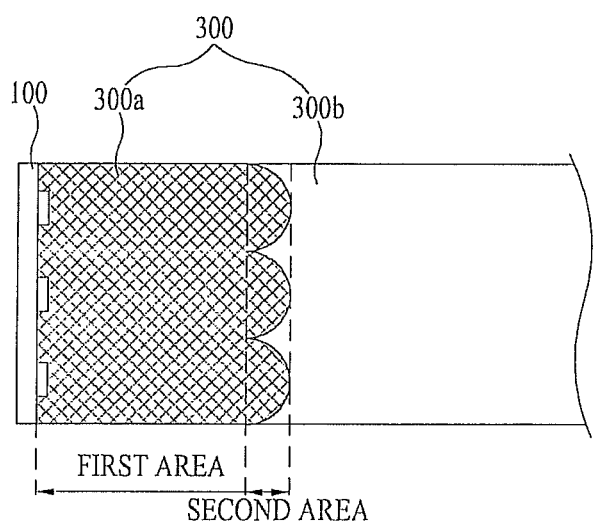
Figure 16C:
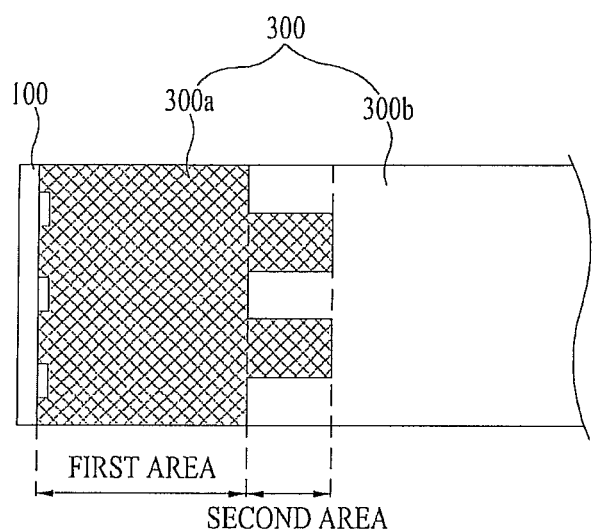

FIGS. 16A to 16C are plan views showing various shapes of the second area of the specular reflection area.

In FIG. 16A, the second area of the specular reflection area 300a may have triangular shapes. In FIG. 16B, the second area of the specular reflection area 300a may have semicircular shapes. In FIG. 16C, the second area of the specular reflection area 300a may have square shapes.

As shown in FIGS. 16A to 16C, the specular reflection area 300a of the second reflector 300 may include a first area adjacent to the light source module 100 and a second area distant from the light source module 100.

The second area of the specular reflection area 300a may have a size less than that of the first area of the specular reflection area 300a and may have various shapes, such as triangular shapes, semicircular shapes, square shapes and polygonal shapes.

That is, the size of the second area of the specular reflection area 300a may gradually decrease as the second area of the specular reflection area 300a becomes distant from the light source module 100.

On the other hand, the size of the second area of the diffuse reflection area 300b may gradually increase as the second area of the diffuse reflection area 300b becomes distant from the light source module 100.

The specular reflection area 300a of the second reflector 300 may occupy about 20 to 30% of the entire area of the second reflector 300.

According to circumstances, a size ratio of the specular reflection area 300a to the diffuse reflection area 300b of the second reflector 300 may be about 1:1 to 20.

Also, a size ratio of the first area to the second area of the specular reflection area 300a of the second reflector 300 may be about 1 to 10:0.4.

The second area of the specular reflection area 300a may extend about 5 to 200 mm from the first area of the specular reflection area 300a.

The specular reflection layer formed at the specular reflection area 300a of the second reflector 300 and the diffuse reflection layer formed at the diffuse reflection area 300b of the second reflector 300 may be configured by attaching a reflective film to a mold body or a metal body or may be a mold body or a metal body having a specular reflection surface or a diffuse reflection surface.

According to circumstances, the specular reflection layer and the diffuse reflection layer may be formed of a copolymer resin, such as plastic, by injection molding.

The reflective film may contain a metal and/or a metal oxide. For example, the reflective layer may contain a metal or a metal oxide, such as aluminum (Al), silver (Ag), gold (Au) or titanium dioxide ($TiO_2$), exhibiting high reflectivity.

A bonding agent or coupling member is formed at the interface between the specular reflection area 300a having the specular reflection layer and the diffuse reflection area 300b having the diffuse reflection layer to connect the specular reflection area 300a and the diffuse reflection area 300b to each other.

FIGS. 17A to 17C and 18 are views explaining uniformity of luminance depending upon shapes of the specular reflection area of the second reflector.

Figure 17A:
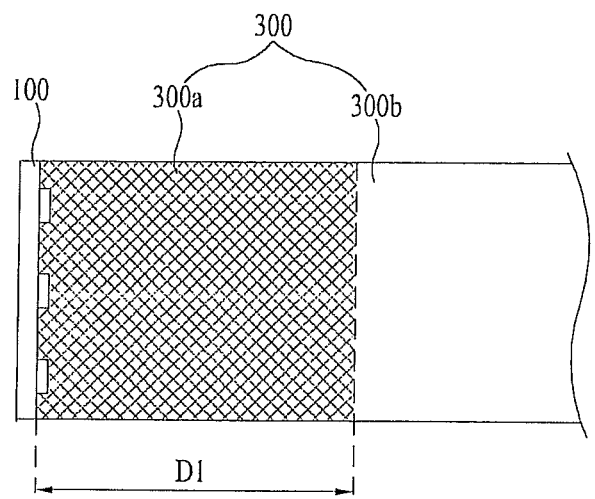
FIGS. 17A to 17C are views explaining uniformity of luminance depending upon shapes of the specular reflection area of the second reflector.
Figure 17B:
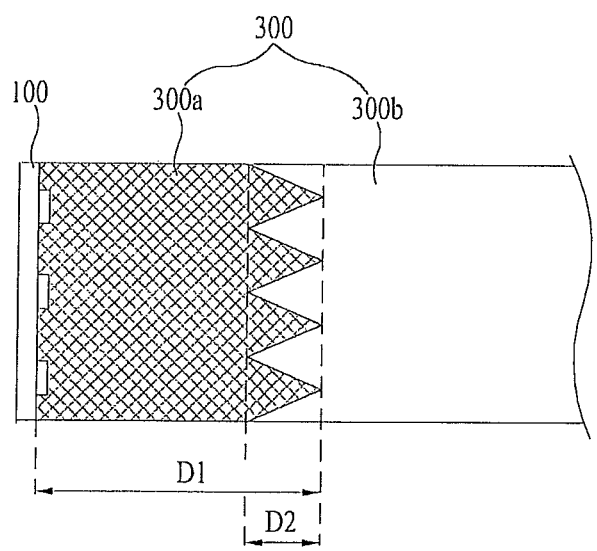
Figure 17C:
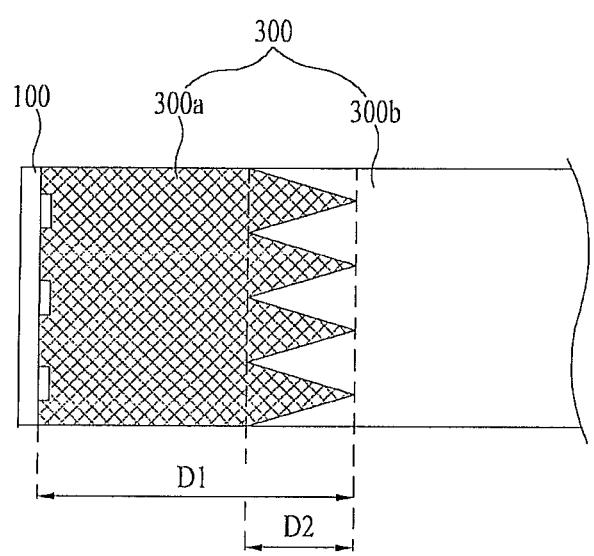
Figure 18:
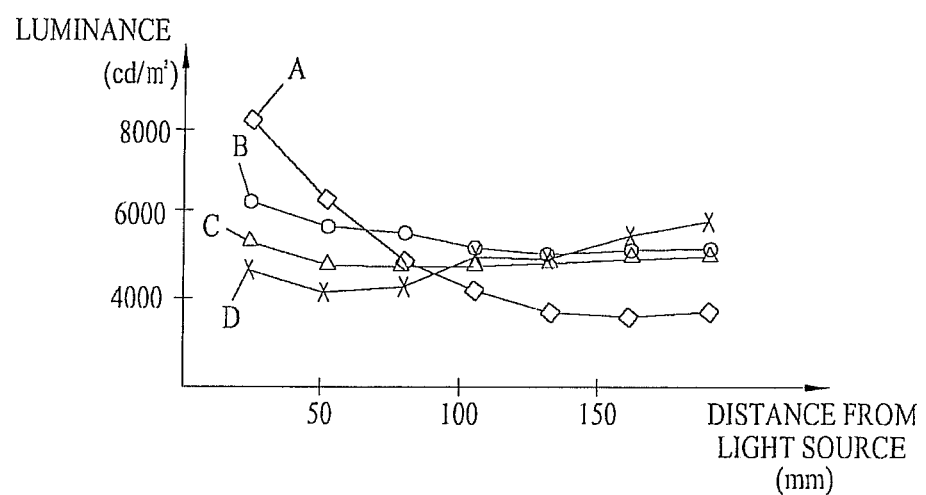
FIG. 18 is a graph showing comparison of luminance between embodiments based on distance from a light source.

In FIG. 17A, no triangular shape is formed at one end point of the specular reflection area. In FIGS. 17B and 17C, triangular shapes are formed at one end point of the specular reflection area. FIG. 18 is a graph showing comparison of uniformity of luminance between embodiments shown in FIGS. 17A to 17C.

It is assumed that a second reflector having only a diffuse reflection area without a specular reflection area although not shown is embodiment A, a second reflector 300 having a specular reflection area 300a having a distance D1 between opposite end points of about 100 mm as shown in FIG. 17A is embodiment B, a second reflector 300 having triangular shapes, each of which has a distance D2 (that is, the height of each of the triangular shapes) between opposite end points of about 30 mm, within a specular reflection area 300a having a distance D1 between opposite end points of about 100 mm as shown in FIG. 17B is embodiment C, and a second reflector 300 having triangular shapes, each of which has a distance D2 (that is, the height of each of the triangular shapes) between opposite end points of about 90 mm, within a specular reflection area 300a having a distance D1 between opposite end points of about 100 mm as shown in FIG. 17C is embodiment D.

FIG. 18 is a graph showing comparison of luminance between the respective embodiments based on distance from a light source.

Referring to FIG. 18, it can be seen that, in embodiment A having no specular reflection area, the luminance of the area adjacent to the light source is high and the luminance of the area distant from the light source is low.

It can be seen that, in embodiment B having the specular reflection area, the luminance of the area adjacent to the light source is low and the luminance of the area distant from the light source is high.

It can be seen that, in embodiments C and D having the triangular shapes within the specular reflection area, the luminance of the area adjacent to the light source and the luminance of the area distant from the light source are almost uniform.

Also, it can be seen that embodiment D having the triangular shapes each of which has a height of about 90 mm exhibits higher and more uniform luminance than embodiment C having the triangular shapes each of which has a height of about 30 mm.

The specular reflection area of the second reflector may include a first area adjacent to the light source module and a second area distant from the light source module. It can be seen that luminance is uniform in a case in which the second area of the specular reflection area gradually decreases as the second area becomes distant from the light source.

Figure 19:
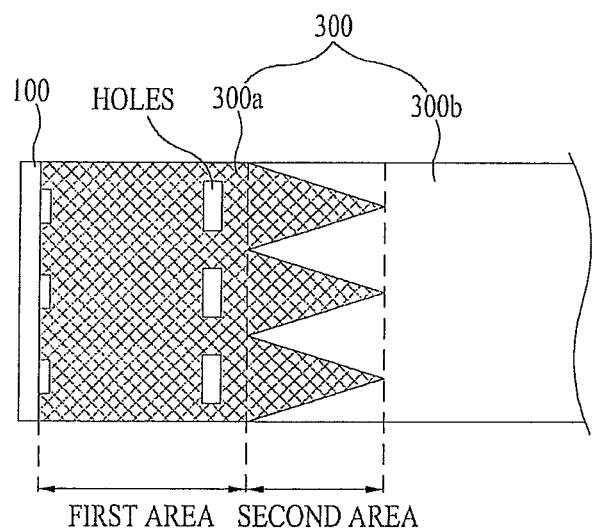
FIG. 19 is a view showing a specular reflection area having holes and triangular shapes.

FIG. 19 is a view showing a specular reflection area having holes and triangular shapes.

As shown in FIG. 19, a specular reflection layer having a plurality of holes may be formed at the first area of the specular reflection area 300a, and a specular reflection layer having triangular shapes may be formed at the second area of the specular reflection area 300a.

A diffuse reflection layer located under the specular reflection layer may be exposed through the holes formed at the first area.

In FIG. 19, the number or size of the holes of the specular reflection layer formed at the first area of the specular reflection area 300a and the shape of the specular reflection layer formed at the second area of the specular reflection area 300a may be properly adjusted to provide overall uniform luminance.

Figure 20A:
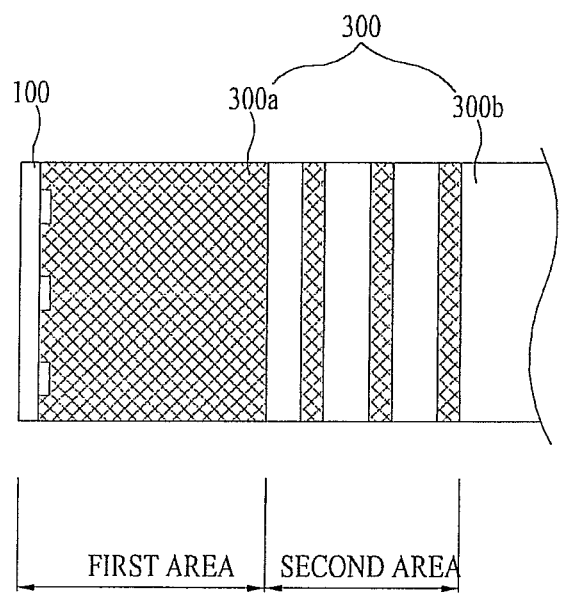
FIGS. 20A and 20B are views showing a specular reflection area having stripe shapes.
Figure 20B:
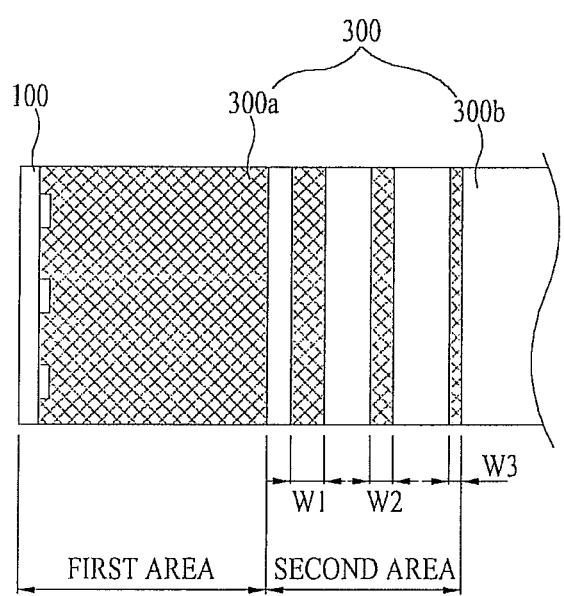

FIGS. 20A and 20B are views showing a specular reflection area having stripe shapes.

As shown in FIGS. 20A and 20B, a specular reflection layer may be formed at the first area of the specular reflection area 300a, and a specular reflection layer having stripe shapes may be formed at the second area of the specular reflection area 300a.

The specular reflection layer formed at the second area of the specular reflection area 300a has a plurality of stripes. The stripes may have the same width or different widths.

In FIG. 20A, a plurality of stripes having the same width are arranged at the second area of the specular reflection area 300a. In FIG. 20B, a plurality of stripes having different widths are arranged at the second area of the specular reflection area 300a.

As shown in FIG. 20B, the width w1 of a stripe adjacent to the light source module 100 may greater than the width w3 of a stripe distant from the light source module 100.

According to circumstances, a plurality holes may be formed at the specular reflection layer formed at the first area of the specular reflection area 300a, and a diffuse reflection layer located under the specular reflection layer may be exposed through the holes.

In FIGS. 20A and 20B, the number and width of the stripes formed at the second area of the specular reflection area 300a may be properly adjusted to provide overall uniform luminance.

Meanwhile, the second reflector having the specular reflection area and the diffuse reflection area may be configured to have various shapes based on the arrangement of the light source module.

Figure 21:
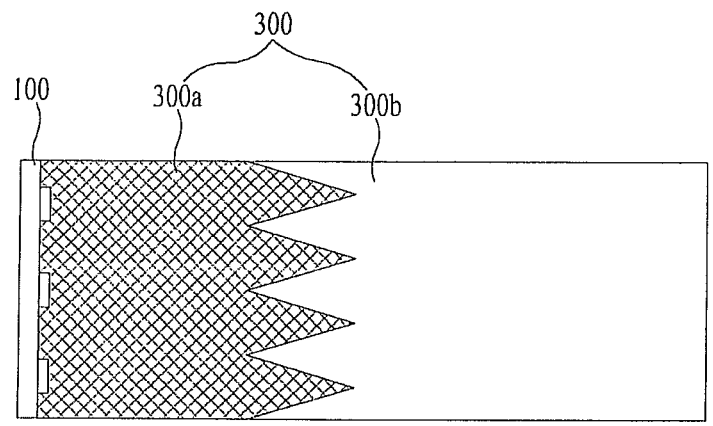
FIG. 21 is a view showing a one edge type second reflector.
Figure 22:
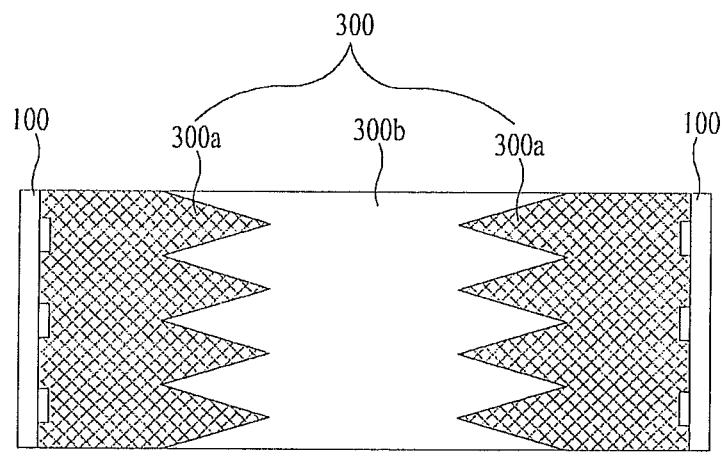
FIG. 22 is a view showing a two edge type second reflector.
Figure 23:
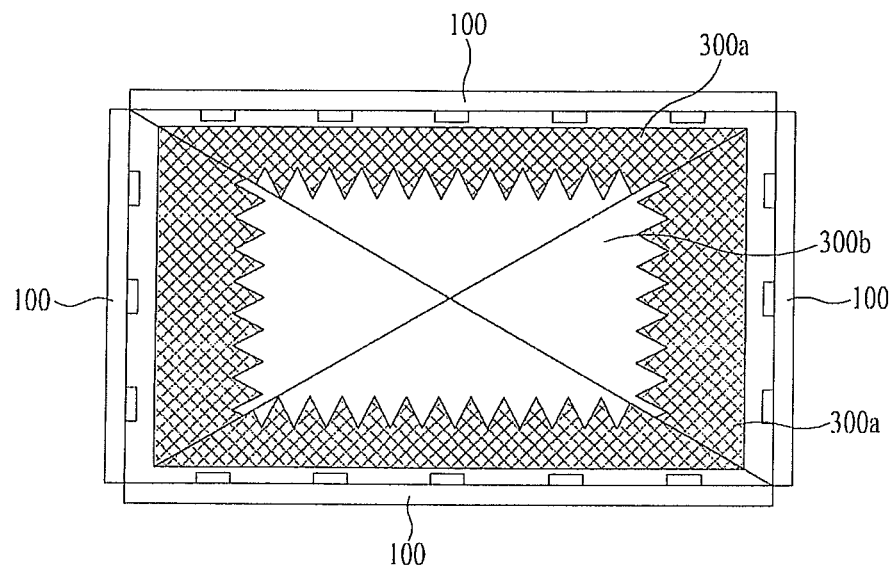
FIGS. 23 and 24 are views showing four edge type second reflectors.
Figure 24:
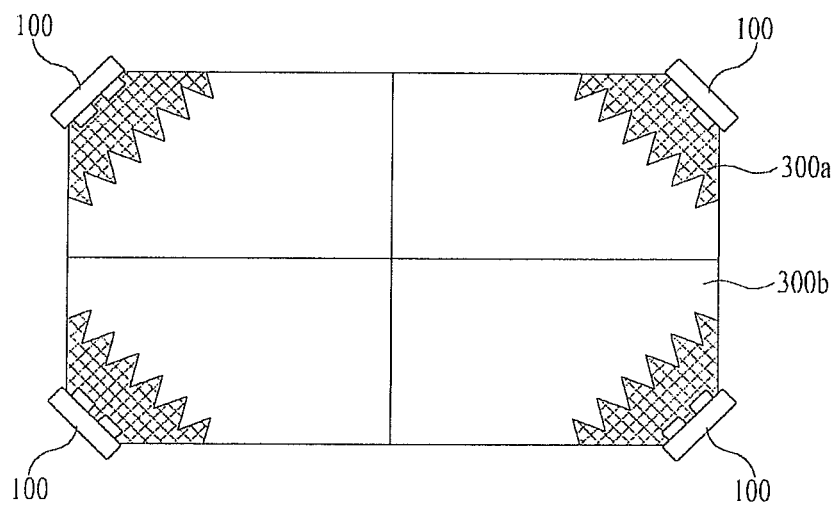

FIG. 21 is a view showing a one edge type second reflector.
FIG. 22 is a view showing a two edge type second reflector.
FIGS. 23 and 24 are views showing four edge type second reflectors.

FIG. 21 is a plan view of the one edge type second reflector. As shown in FIG. 21, a light source module 100 may be disposed at one side of the one edge type second reflector 300. A specular reflection area 300a may be adjacent to the light source module 100. A diffuse reflection area 300b may be distant from the light source module 100.

FIG. 22 is a plan view of the two edge type second reflector. As shown in FIG. 22, light source modules 100 may be disposed at opposite sides of the two edge type second reflector 300. Specular reflection areas 300a may be adjacent to the respective light source modules 100. A diffuse reflection area 300b may be distant from the light source modules 100.

FIG. 23 is a plan view of the four edge type second reflector. As shown in FIG. 23, light source modules 100 may be disposed at four sides of the four edge type second reflector 300. Specular reflection areas 300a may be adjacent to the respective light source modules 100. Diffuse reflection areas 300b may be distant from the respective light source modules 100.

FIG. 24 is a plan view of the four edge type second reflector. As shown in FIG. 24, light source modules 100 may be disposed at four corners of the four edge type second reflector 300. Specular reflection areas 300a may be adjacent to the respective light source modules 100. Diffuse reflection areas 300b may be distant from the respective light source modules 100.

Also, the backlight unit according to the embodiment may further include an optical member spaced a predetermined distance from the second reflector. An air guide may be defined between the second reflector and the optical member.

Figure 25:
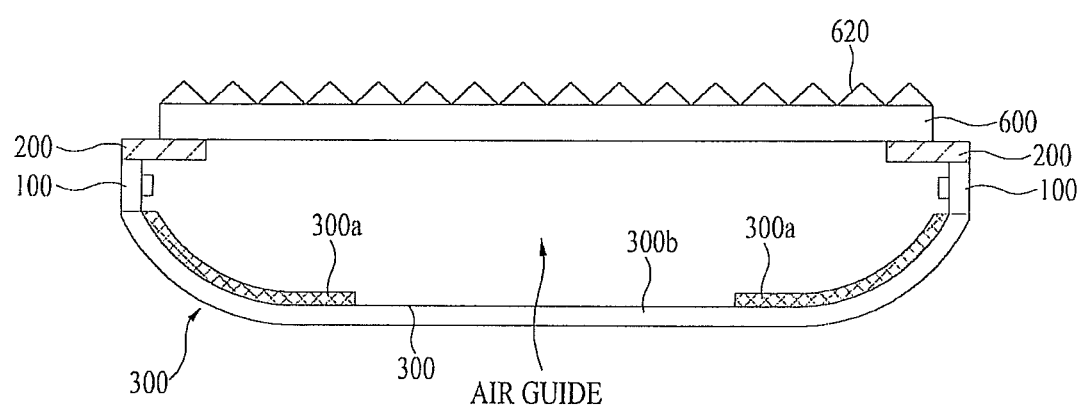
FIG. 25 is a view showing a backlight unit including an optical member.
Figure 26:
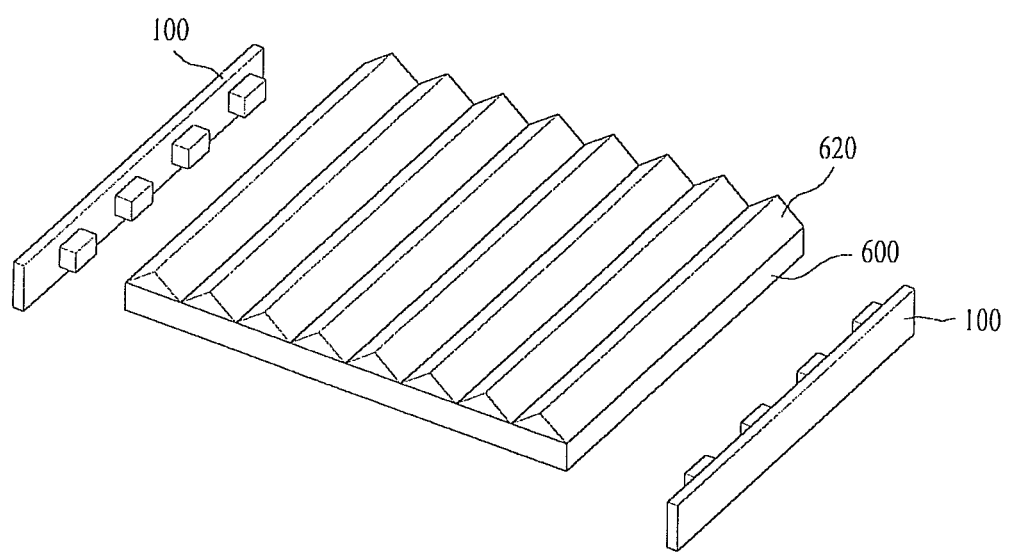
FIG. 26 is a view showing an example of a shape of the optical member.

FIG. 25 is a view showing a backlight unit including an optical member. FIG. 26 is a view showing an example of a shape of the optical member.

As shown in FIG. 25, the optical member 600 may be disposed at the open area of the first reflector 200. The optical member 600 may have several layers. An uneven pattern 620 may be provided at the uppermost layer or another layer.

According to circumstances, the optical member 600 may include at least one sheet selected from among a diffusion sheet, prism sheet, luminance increasing sheet and the like.

The diffusion sheet serves to diffuse light emitted from a light source, the prism sheet serves to guide the diffused light to a light emission area, and the luminance increasing sheet serves to increase luminance.

The optical member 600 is provided to diffuse light emitted through the open area of the first reflector 200. The uneven pattern 620 may be formed at an upper surface of the optical member 600 so as to improve a diffusion effect.

As shown in FIG. 26, the uneven pattern 620 may have stripe shapes arranged along the light source modules 100.

The uneven pattern 620 may have protrusion parts formed at the surface of the optical member 600. Each of the protrusion parts may have a first surface and second surface which face each other. An angle between the first surface and second surface may be an obtuse angle or an acute angle.

According to circumstances, the optical member 600 may include at least one sheet selected from among a diffusion sheet, prism sheet, luminance increasing sheet and the like.

The diffusion sheet serves to diffuse light emitted from a light source, the prism sheet serves to guide the diffused light to a light emission area, and the luminance increasing sheet serves to increase luminance.

Meanwhile, the diffuse reflection area 300b of the second reflector 300 may reflect incident light in a Lambertian distribution and/or a Gaussian distribution.

At all points of the diffuse reflection area 300b, the quantity of light reflected in the Lambertian distribution may be greater or less than the quantity of light reflected in the Gaussian distribution when an incidence angle of light incident upon each of the points is about 55 degrees or more with respect to a normal line passing each of the points.

For example, a reflective sheet exhibiting a specular reflection property may be disposed at the specular reflection area 300a of the second reflector 300, and a reflective sheet exhibiting a diffuse reflection property may be disposed at the diffuse reflection area 300b of the second reflector 300.

That is, a reflective sheet exhibiting diffuse reflection properties in which light is reflected in the Lambertian distribution and the Gaussian distribution may be disposed at the diffuse reflection area 300b of the second reflector 300.

When an incidence angle of incident light is about 55 degrees or more with respect to a normal line, the reflective sheet disposed at the diffuse reflection area 300b may exhibit a diffuse reflection property in which the quantity of light reflected in the Gaussian distribution is greater than the quantity of light reflected in the Lambertian distribution.

According to circumstances, when an incidence angle of incident light is about 60 degrees or more with respect to a normal line, the reflective sheet disposed at the diffuse reflection area 300b may exhibit a diffuse reflection property in which the quantity of light reflected in the Gaussian distribution is greater than the quantity of light reflected in the Lambertian distribution.

That is, when an incidence angle of incident light is about 50 to 70 degrees with respect to a normal line, the reflective sheet disposed at the diffuse reflection area 300b may exhibit a diffuse reflection property in which a ratio of quantity of light reflected in the Lambertian distribution to quantity of light reflected in the Gaussian distribution is 5:5.

Figure 27:
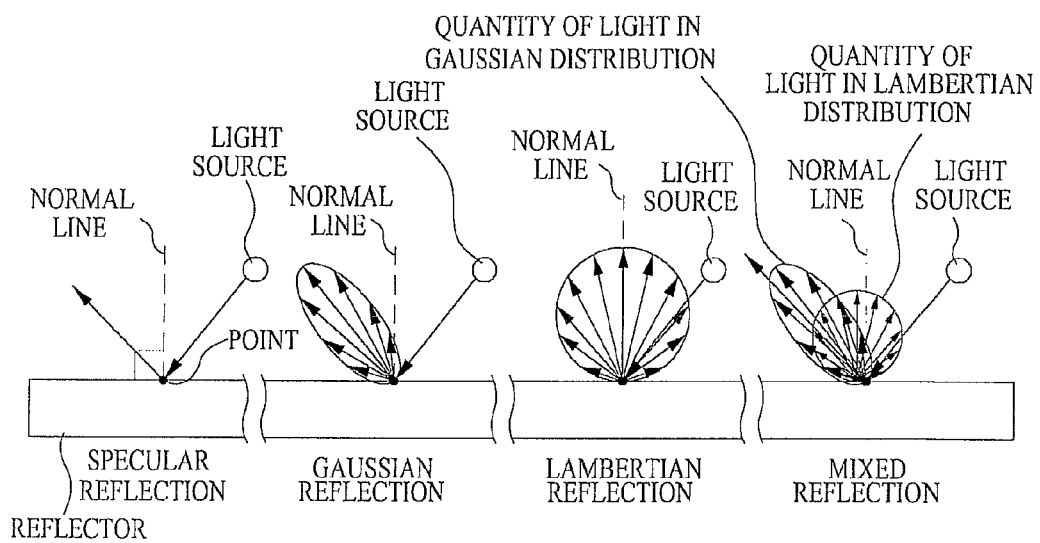
FIG. 27 is a view explaining a specular reflection property and diffuse reflection property of light.

FIG. 27 is a view explaining a specular reflection property and diffuse reflection property of light.

As shown in FIG. 27, light may be specularly reflected or diffusely reflected based on a surface property of the reflector.

The diffuse reflection may include Gaussian reflection, Lambertian reflection and mixed reflection.

Generally, the specular reflection is reflection in which, when light is incident upon a point of the reflector, an angle between a normal line passing the point and an optical axis of the incident light is equal to an angle between the normal line and an optical axis of reflected light.

The Gaussian reflection is reflection in which intensity of reflected light based on angle at the surface of the reflector and an angle between a normal line and the reflected light vary according to values of a Gaussian function.

The Lambertian reflection is reflection in which intensity of reflected light based on angle at the surface of the reflector and an angle between a normal line and the reflected light vary according to values of a cosine function.

The mixed reflection includes at least one selected from among specular reflection, Gaussian reflection and Lambertian reflection.

In this embodiment, the surface property of the second reflector 300 may be adjusted to control a reflection property of light.

Figure 28:
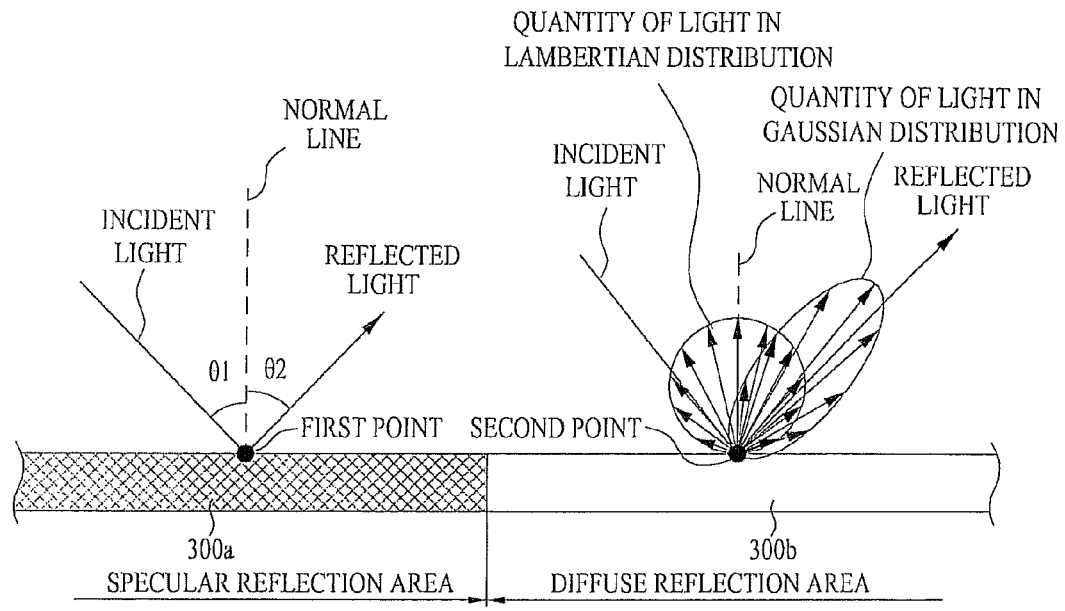
FIG. 28 is a view showing distribution of light reflected at a diffuse reflection area of FIG. 1A.

FIG. 28 is a view showing distribution of light reflected at the diffuse reflection area of FIG. 1A.

As shown in FIG. 28, when light is incident upon a first point at the specular reflection area 300a of the second reflector 300, an angle $\theta 1$ between an optical axis of the incident light and a normal line passing the first point may be equal to an angle $\theta 1$ between an optical axis of light reflected from the first point and the normal line.

When light is incident upon a second point at the diffuse reflection area 300b of the second reflector 300, light reflected from the second point may be reflected in a Lambertian distribution or a Gaussian distribution.

When an angle $\theta$ between an optical axis of the light incident upon the second point and a normal line passing the second point is about 55 degrees or more, the quantity of light reflected in the Gaussian distribution may be greater than the quantity of light reflected in the Lambertian distribution.

According to circumstances, when an angle $\theta$ between an optical axis of the light incident upon the second point and a normal line passing the second point is about 60 degrees or more, the quantity of light reflected in the Gaussian distribution may be greater than the quantity of light reflected in the Lambertian distribution.

That is, when an incidence angle of incident light is about 50 to 70 degrees with respect to a normal line, the reflective sheet disposed at the diffuse reflection area 300b may exhibit a diffuse reflection property in which a ratio of quantity of light reflected in the Lambertian distribution to quantity of light reflected in the Gaussian distribution is 5:5.

The second reflector 300 is configured so that the second reflector 300 exhibits a light reflection property so as to reduce the difference of luminance between the area adjacent to the light source 100 and the area distant from the light source 100.

That is, the specular reflection area 300a adjacent to the light source 110 may serve to specularly reflect light and to transmit the light to a central area of the backlight at which luminance is low. The diffuse reflection area 300b distant from the light source 110 may serve to diffusely reflect light to compensate for low luminance.

Consequently, the light reflection properties of the specular reflection area 300a and the diffuse reflection area 300b of the second reflector 300 may be properly adjusted to provide overall uniform luminance.

The second reflector 300 may contain a metal or a metal oxide, such as aluminum (Al), silver (Ag), gold (Au) or titanium dioxide ($TiO_2$), exhibiting high reflectivity. The specular reflection area 300a and the diffuse reflection area 300b of the second reflector 300 may be formed of different materials. Also, the specular reflection area 300a and the diffuse reflection area 300b may have different surface roughnesses.

That is, the specular reflection area 300a and the diffuse reflection area 300b of the second reflector 300 may be formed of the same material while having different surface roughnesses.

Alternatively, the specular reflection area 300a and the diffuse reflection area 300b of the second reflector 300 may be formed of different materials while having different surface roughnesses.

For example, the diffuse reflection area 300b of the second reflector 300 may include a first layer formed of polyethylene terephthalate (PET) and a second layer disposed on the first layer, the second layer being formed of $TiO_2$ and/or $SiO_2$ particles.

Figure 29:
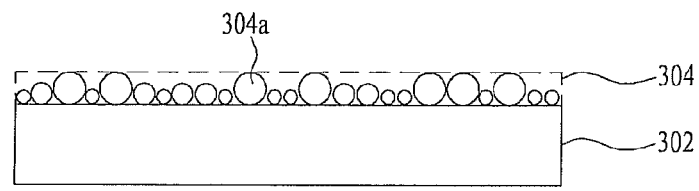
FIG. 29 is a sectional view showing the construction of a diffuse reflection area of the second reflector.

FIG. 29 is a sectional view showing the construction of the diffuse reflection area of the second reflector.

As shown in FIG. 29, the diffuse reflection area of the second reflector may be configured to have a structure in which a second layer 304 is deposited on a first layer 302.

The first layer 302 may be formed of polyethylene terephthalate (PET). The second layer 304 may be formed of $TiO_2$ and/or $SiO_2$ particles 304a.

The particles 304a of the second layer 304 may have the same size or different sizes.

The particles 304a of the second layer 304 may occupy about 20 to 90% of the entire area of the first layer 302.

Also, the size of the particles 304a may be about 5 to 50 um.

A passivation layer may be further formed on the second layer 304.

The weight of particles contained in the second layer 304 of the diffuse reflection area of the second reflector may be adjusted to control a light reflection property of the diffuse reflection area 300b.

Figure 30:
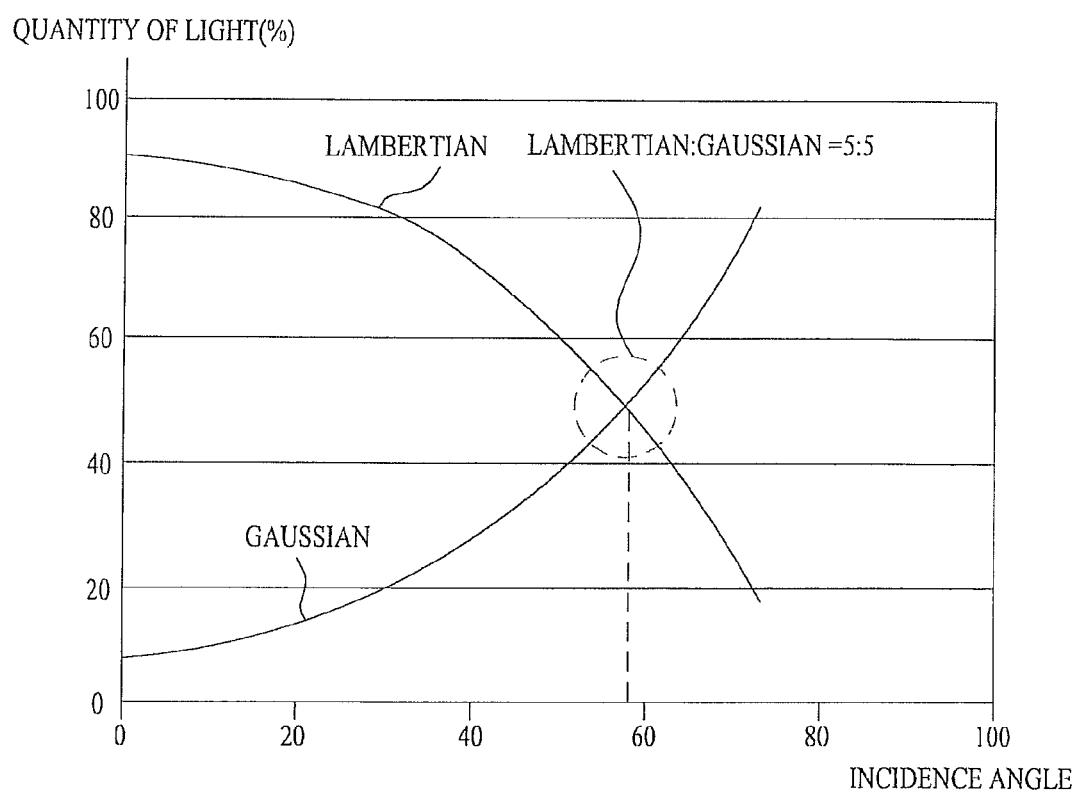
FIG. 30 is a graph showing a light reflection property of the diffuse reflection area.

FIG. 30 is a graph showing a light reflection property of the diffuse reflection area.

It can be seen from FIG. 30 that, when an incidence angle of light incident upon the diffuse reflection area is about 57.5 degrees with respect to a normal line, a ratio of quantity of light reflected in a Lambertian distribution to quantity of light reflected in a Gaussian distribution is 5:5.

When the weight of $TiO_2$ and/or $SiO_2$ particles contained in the diffuse reflection area of the second reflector occupies about 50% of the entire size of the diffuse reflection area, the quantity of light reflected in the Lambertian distribution and the quantity of light reflected in the Gaussian distribution based on an incidence angle of light are indicated in Table 1.

TABLE 1

| Incidence angle (°) | Quantity of light in Lambertian distribution (%) | Quantity of light in Gaussian distribution (%) |
|---|---|---|
| 0 | 91 | 9 |
| 10 | 92 | 8 |
| 20 | 90 | 10 |
| 30 | 86 | 14 |
| 40 | 78 | 22 |
| 50 | 65 | 35 |
| 60 | 45 | 55 |
| 70 | 17 | 83 |

In this embodiment, therefore, the light reflection property of the diffuse reflection area may be controlled as indicated in Table 1 to configure the diffuse reflection area so that the quantity of light reflected in the Gaussian distribution is greater than the quantity of light reflected in the Lambertian distribution based on the incidence angle of light or so that the quantity of light reflected in the Lambertian distribution is greater than the quantity of light reflected in the Gaussian distribution based on the incidence angle of light.

That is, when an incidence angle of incident light is about 50 to 70 degrees with respect to a normal line, the reflective sheet disposed at the diffuse reflection area 300b may exhibit a diffuse reflection property in which a ratio of quantity of light reflected in the Lambertian distribution to quantity of light reflected in the Gaussian distribution is 5:5.

Meanwhile, the diffuse reflection area 300b of the second reflector 300 may occupy about 50 to 95% of the entire area of the second reflector 300.

According to circumstances, the diffuse reflection area 300b may occupy about 70 to 80% of the entire area of the second reflector 300.

Also, a size ratio of the specular reflection area 300a to the diffuse reflection area 300b of the second reflector 300 may be 1:1 to 20.

The size ratio of the specular reflection area 300a to the diffuse reflection area 300b of the second reflector 300 is set so as to reduce the difference of luminance between an area adjacent to the light source 110 and an area distant from the light source 110.

That is, the size ratio of the specular reflection area 300a to the diffuse reflection area 300b of the second reflector 300 may be properly adjusted to provide overall uniform luminance.

Also, the diffuse reflection area 300b may include a plurality of diffuse reflection areas exhibiting different light reflection properties.

Figure 31A:
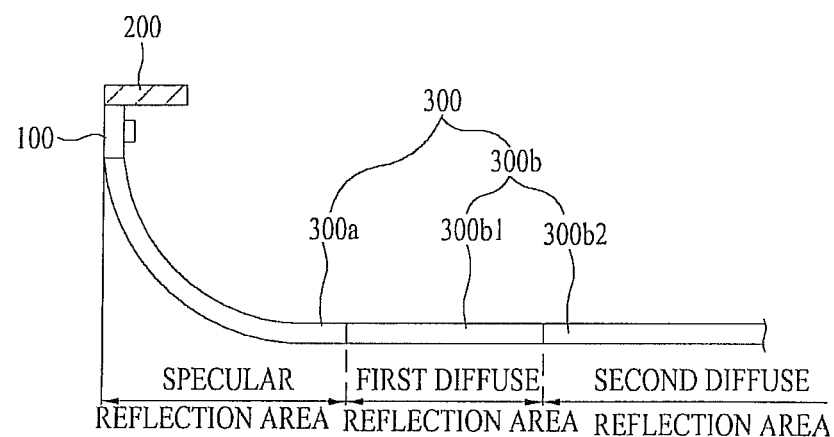
FIGS. 31A and 31B are views showing a second reflector having a plurality of diffuse reflection areas exhibiting different light reflection properties.
Figure 31B:
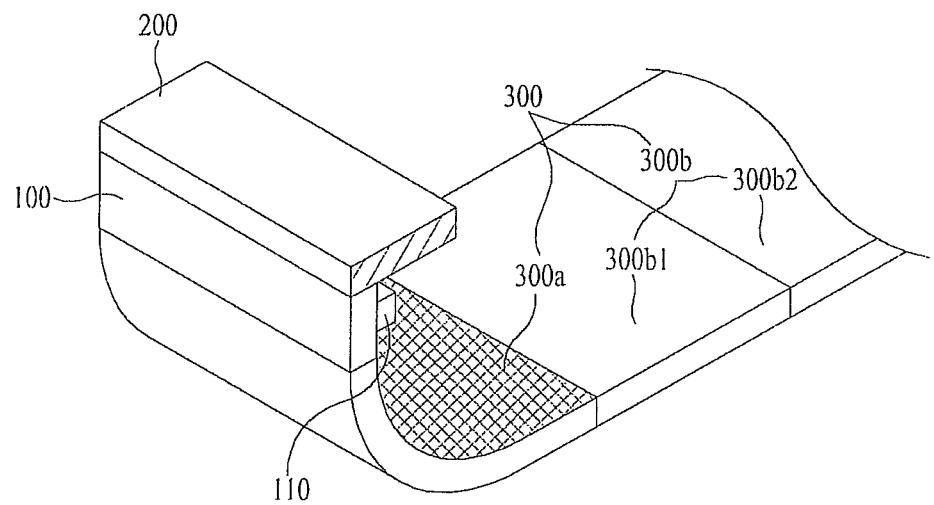

FIGS. 31A and 31B are views showing a second reflector having a plurality of diffuse reflection areas exhibiting different light reflection properties. FIG. 31A is a sectional view of the second reflector, and FIG. 31B is a top perspective view of the second reflector.

As shown in FIGS. 31A and 31B, the backlight unit may include a light source module 100 including at least one light source 110, a first reflector 200 and a second reflector 300.

The second reflector 300 may include a specular reflection area 300a and a diffuse reflection area 300b. The diffuse reflection area 300b may include a first diffuse reflection area 300b1 and a second diffuse reflection area 300b2.

The specular reflection area 300a may serve to specularly reflect incident light. The diffuse reflection area 300b may serve to diffusely reflect incident light. The specular reflection area 300a and the diffuse reflection area 300b may have a light reflectivity of about 50 to 99.99%.

The first and second diffuse reflection areas 300*b*1 and 300*b*2 may reflect incident light in a Lambertian distribution and/or a Gaussian distribution.

At all points of the first diffuse reflection area 300*b*1, the quantity of light reflected in the Gaussian distribution may be greater than the quantity of light reflected in the Lambertian distribution when an incidence angle of light incident upon each of the points is about 55 degrees or more with respect to a normal line passing each of the points.

At all points of the second diffuse reflection area 300*b*2, the quantity of light reflected in the Gaussian distribution may be greater than the quantity of light reflected in the Lambertian distribution when an incidence angle of light incident upon each of the points is about 60 degrees or more with respect to a normal line passing each of the points.

At this time, at the first diffuse reflection area 300*b*1, the quantity of light reflected in the Gaussian distribution may be greater than the quantity of light reflected in the Lambertian distribution.

At the second diffuse reflection area 300*b*2, the quantity of light reflected in the Lambertian distribution may be greater than the quantity of light reflected in the Gaussian distribution.

For example, a reflective sheet exhibiting a specular reflection property may be disposed at the specular reflection area 300*a* of the second reflector 300, and a reflective sheet exhibiting a diffuse reflection property may be disposed at the diffuse reflection area 300*b* of the second reflector 300.

That is, a reflective sheet exhibiting diffuse reflection properties in which light is reflected in the Lambertian distribution and the Gaussian distribution may be disposed at the diffuse reflection area 300*b* of the second reflector 300.

When an incidence angle of incident light is about 55 degrees or more with respect to a normal line, the reflective sheet disposed at the first diffuse reflection area 300*b*1 may exhibit a diffuse reflection property in which the quantity of light reflected in the Gaussian distribution is greater than the quantity of light reflected in the Lambertian distribution.

When an incidence angle of incident light is about 60 degrees or more with respect to a normal line, the reflective sheet disposed at the second diffuse reflection area 300*b*2 may exhibit a diffuse reflection property in which the quantity of light reflected in the Gaussian distribution is greater than the quantity of light reflected in the Lambertian distribution.

At this time, the first diffuse reflection area 300*b*1 may exhibit a diffuse reflection property in which the quantity of light reflected in the Gaussian distribution is greater than the quantity of light reflected in the Lambertian distribution.

The second diffuse reflection area 300*b*2 may exhibit a diffuse reflection property in which the quantity of light reflected in the Lambertian distribution is greater than the quantity of light reflected in the Gaussian distribution.

That is, when an incidence angle of incident light is about 50 to 70 degrees with respect to a normal line, the reflective sheet disposed at the diffuse reflection area 300*b* may exhibit a diffuse reflection property in which a ratio of quantity of light reflected in the Lambertian distribution to quantity of light reflected in the Gaussian distribution is 5:5.

The second reflector 300 is configured so that the second reflector 300 exhibits a light reflection property so as to reduce the difference of luminance between the area adjacent to the light source 100 and the area distant from the light source 100.

That is, the specular reflection area 300*a* adjacent to the light source 110 may serve to specularly reflect light and to transmit the light to a central area of the backlight at which luminance is low. The first and second diffuse reflection areas 300*b*1 and 300*b*2 distant from the light source 110 may serve to diffusely reflect light to compensate for low luminance.

Consequently, the light reflection properties of the specular reflection area 300*a* and the first and second diffuse reflection areas 300*b*1 and 300*b*2 of the second reflector 300 may be properly adjusted to provide overall uniform luminance.

The second reflector 300 may contain a metal or a metal oxide, such as aluminum (Al), silver (Ag), gold (Au) or titanium dioxide ($TiO_2$), exhibiting high reflectivity. The specular reflection area 300*a* and the first and second diffuse reflection areas 300*b*1 and 300*b*2 of the second reflector 300 may be formed of different materials. Also, the specular reflection area 300*a* and the first and second diffuse reflection areas 300*b*1 and 300*b*2 may have different surface roughnesses.

That is, the specular reflection area 300*a* and the first and second diffuse reflection areas 300*b*1 and 300*b*2 of the second reflector 300 may be formed of the same material while having different surface roughnesses.

Alternatively, the specular reflection area 300*a* and the first and second diffuse reflection areas 300*b*1 and 300*b*2 of the second reflector 300 may be formed of different materials while having different surface roughnesses.

For example, the diffuse reflection area 300*b* of the second reflector 300 may include a first layer formed of polyethylene terephthalate (PET) and a second layer disposed on the first layer, the second layer being formed of $TiO_2$ and/or $SiO_2$ particles.

The first and second diffuse reflection areas 300*b*1 and 300*b*2 may contain the same material. The particle weight of the material contained in the first diffuse reflection area 300*b*1 may be different from that of the material contained in the second diffuse reflection area 300*b*2.

That is, the particle weight of the material contained in the first diffuse reflection area 300*b*1 may be less than that of the material contained in the second diffuse reflection area 300*b*2.

This is because the first and second diffuse reflection areas 300*b*1 and 300*b*2 may have different surface roughnesses depending upon particle weight.

The particle weight of the material contained in the first diffuse reflection area 300*b*1 may occupy about 20 to 90% of the entire size of the first diffuse reflection area 300*b*1.

The particle weight of the material contained in the second diffuse reflection area 300*b*2 may occupy about 20 to 90% of the entire size of the second diffuse reflection area 300*b*2.

Also, the first and second diffuse reflection areas 300*b*1 and 300*b*2 may contain the same amount of the same material. The particle size of the material contained in the first diffuse reflection area 300*b*1 may be different from that of the material contained in the second diffuse reflection area 300*b*2.

The particle size of the material contained in the first diffuse reflection area 300*b*1 may be about 5 to 50 um.

The particle weight or size of the material contained in the first and second diffuse reflection areas 300*b*1 and 300*b*2 of the second reflector may be adjusted to control light reflection properties of the first and second diffuse reflection areas 300*b*1 and 300*b*2.

Meanwhile, the size of the first diffuse reflection area 300*b*1 may be equal to or less than that of the second diffuse reflection area 300*b*2.

According to circumstances, a size ratio of the first diffuse reflection area 300*b*1 to the second diffuse reflection area 300*b*2 may be 1:1 to 5.

The size of the specular reflection area 300*a* may be equal to or less than that of the first diffuse reflection area 300*b*1.

According to circumstances, a size ratio of the specular reflection area 300a to the first diffuse reflection area 300b1 may be 1:1 to 4.

The size of the specular reflection area 300a may be equal to or less than that of the second diffuse reflection area 300b2.

According to circumstances, a size ratio of the specular reflection area 300a to the second diffuse reflection area 300b2 may be 1:1 to 20.

Also, the first diffuse reflection area 300b1 may be disposed between the specular reflection area 300a and the second diffuse reflection area 300b2.

The distance between the specular reflection area 300a and the light source 110 is less than that between the first diffuse reflection area 300b1 and the light source 110. The distance between the first diffuse reflection area 300b1 and the light source 110 is less than that between the second diffuse reflection area 300b2 and the light source 110.

Figure 32A:
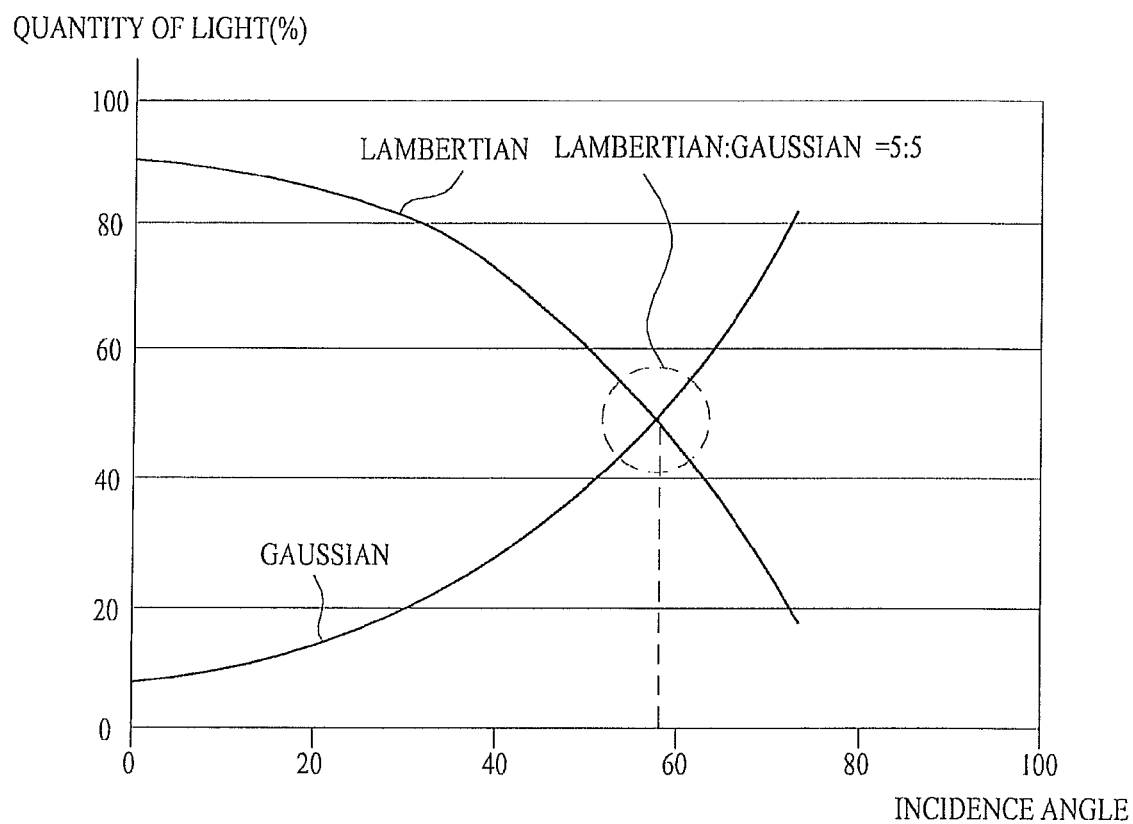
FIG. 32A is a graph showing a light reflection property of a first diffuse reflection area.
Figure 32B:
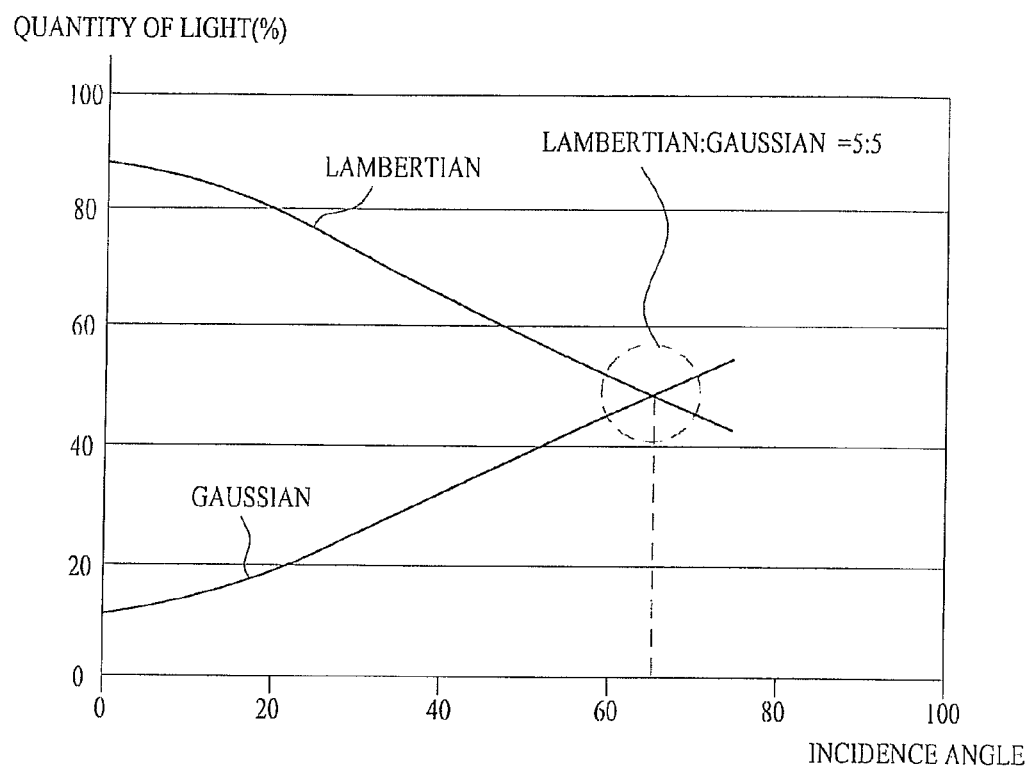
FIG. 32B is a graph showing a light reflection property of a second diffuse reflection area.

FIG. 32A is a graph showing a light reflection property of the first diffuse reflection area. FIG. 32B is a graph showing a light reflection property of the second diffuse reflection area.

It can be seen from FIG. 32A that, when an incidence angle of light incident upon the first diffuse reflection area is about 57.5 degrees with respect to a normal line, a ratio of quantity of light reflected in a Lambertian distribution to quantity of light reflected in a Gaussian distribution is 5:5.

When the weight of $TiO_2$ and/or $SiO_2$ particles contained in the first diffuse reflection area of the second reflector occupies about 50% of the entire size of the first diffuse reflection area, the quantity of light reflected in the Lambertian distribution and the quantity of light reflected in the Gaussian distribution based on an incidence angle of light are indicated in Table 2.

TABLE 2

| Incidence angle (°) | Quantity of light in Lambertian distribution (%) | Quantity of light in Gaussian distribution (%) |
| --- | --- | --- |
| 0 | 91 | 9 |
| 10 | 92 | 8 |
| 20 | 90 | 10 |
| 30 | 86 | 14 |
| 40 | 78 | 22 |
| 50 | 65 | 35 |
| 60 | 45 | 55 |
| 70 | 17 | 83 |

It can be seen from FIG. 32B that, when an incidence angle of light incident upon the second diffuse reflection area is about 67.5 degrees with respect to a normal line, a ratio of quantity of light reflected in a Lambertian distribution to quantity of light reflected in a Gaussian distribution is 5:5.

When the weight of $TiO_2$ and/or $SiO_2$ particles contained in the second diffuse reflection area of the second reflector occupies about 70% of the entire size of the second diffuse reflection area, the quantity of light reflected in the Lambertian distribution and the quantity of light reflected in the Gaussian distribution based on an incidence angle of light are indicated in Table 3.

TABLE 3

| Incidence angle (°) | Quantity of light in Lambertian distribution (%) | Quantity of light in Gaussian distribution (%) |
| --- | --- | --- |
| 0 | 91 | 9 |
| 10 | 89 | 11 |
| 20 | 85 | 15 |
| 30 | 79 | 21 |
| 40 | 71 | 29 |
| 50 | 62 | 38 |
| 60 | 53 | 47 |
| 70 | 44 | 56 |

In this embodiment, therefore, the light reflection property of the diffuse reflection area may be controlled as indicated in Tables 2 and 3 to configure the diffuse reflection area so that the quantity of light reflected in the Gaussian distribution is greater than the quantity of light reflected in the Lambertian distribution based on the incidence angle of light or so that the quantity of light reflected in the Lambertian distribution is greater than the quantity of light reflected in the Gaussian distribution based on the incidence angle of light.

That is, when an incidence angle of incident light is about 50 to 70 degrees with respect to a normal line, the reflective sheet disposed at the diffuse reflection area 300b may exhibit a diffuse reflection property in which a ratio of quantity of light reflected in the Lambertian distribution to quantity of light reflected in the Gaussian distribution is 5:5.

The diffuse reflection area may be divided into two areas exhibiting different light reflection properties. According to circumstances, the diffuse reflection area may be divided into three to ten areas exhibiting different light reflection properties.

The diffuse reflection areas of the second reflector may be designed to exhibit optimal light reflection properties based on overall size and structure of the backlight unit.

Meanwhile, the second reflector having the specular reflection area and the first and second diffuse reflection areas may be configured to have various shapes based on the arrangement of the light source module.

FIGS. 31A and 31B are views showing a one edge type second reflector. As shown in FIGS. 31A and 31B, the light source module 100 may be disposed at one side of the one edge type second reflector 300. The specular reflection area 300a may be adjacent to the light source module 100. The first and second diffuse reflection areas 300b1 and 300b2 may be distant from the light source module 100.

Figure 33:
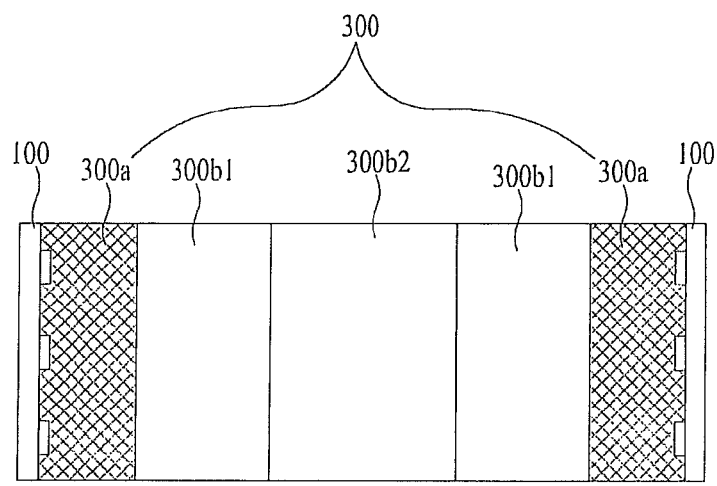
FIG. 33 is a view showing a two edge type second reflector.
Figure 34:
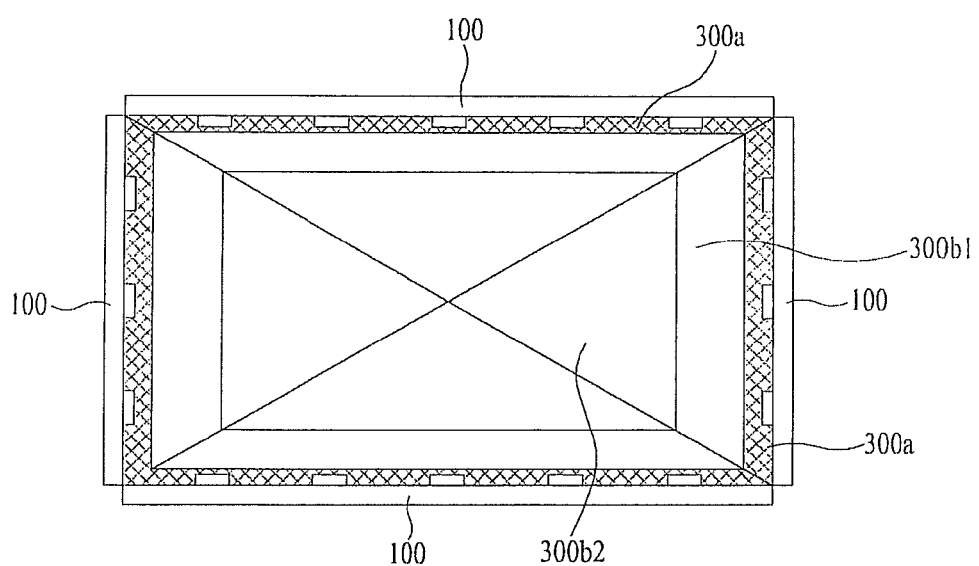
FIGS. 34 and 35 are views showing four edge type second reflectors.
Figure 35:
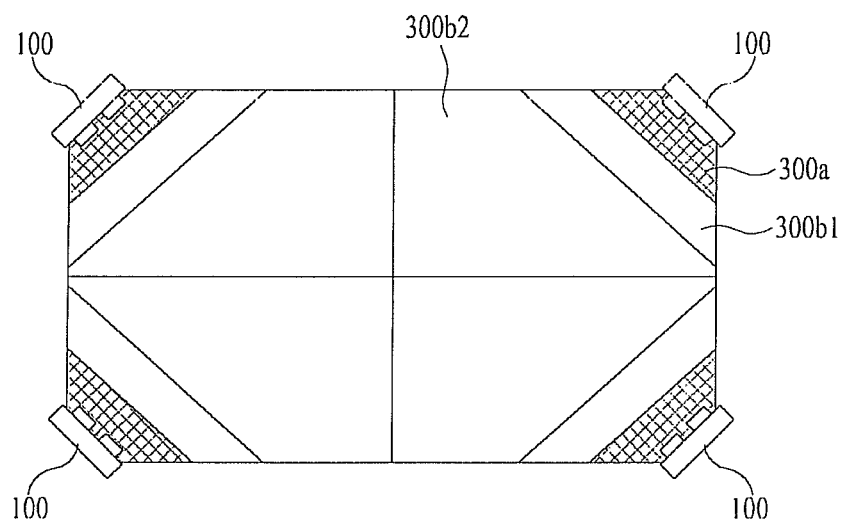

FIG. 33 is a view showing a two edge type second reflector. FIGS. 34 and 35 are views showing four edge type second reflectors.

FIG. 33 is a plan view of the two edge type second reflector. As shown in FIG. 33, light source modules 100 may be disposed at opposite sides of the two edge type second reflector 300. Specular reflection areas 300a may be adjacent to the respective light source modules 100. First and second diffuse reflection areas 300b1 and 300b2 may be distant from the respective light source modules 100.

FIG. 34 is a plan view of the four edge type second reflector. As shown in FIG. 34, light source modules 100 may be disposed at four sides of the four edge type second reflector 300. Specular reflection areas 300a may be adjacent to the respective light source modules 100. First and second diffuse reflection areas 300b1 and 300b2 may be distant from the respective light source modules 100.

FIG. 35 is a plan view of the four edge type second reflector. As shown in FIG. 35, light source modules 100 may be disposed at four corners of the four edge type second reflector 300. Specular reflection areas 300a may be adjacent to the respective light source modules 100. First and second diffuse reflection areas 300b1 and 300b2 may be distant from the respective light source modules 100.

Also, the backlight unit according to the embodiment may further include an optical member spaced a predetermined distance from the second reflector. An air guide may be defined between the second reflector and the optical member.

Meanwhile, the second reflector may have a plurality of patterns.

Figure 36A:
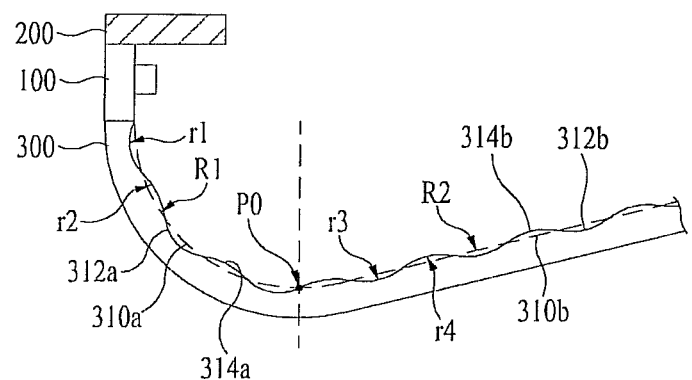
FIGS. 36A and 36B are views showing a second reflector having a plurality of diffuse reflection areas exhibiting different light reflection properties.
Figure 36B:
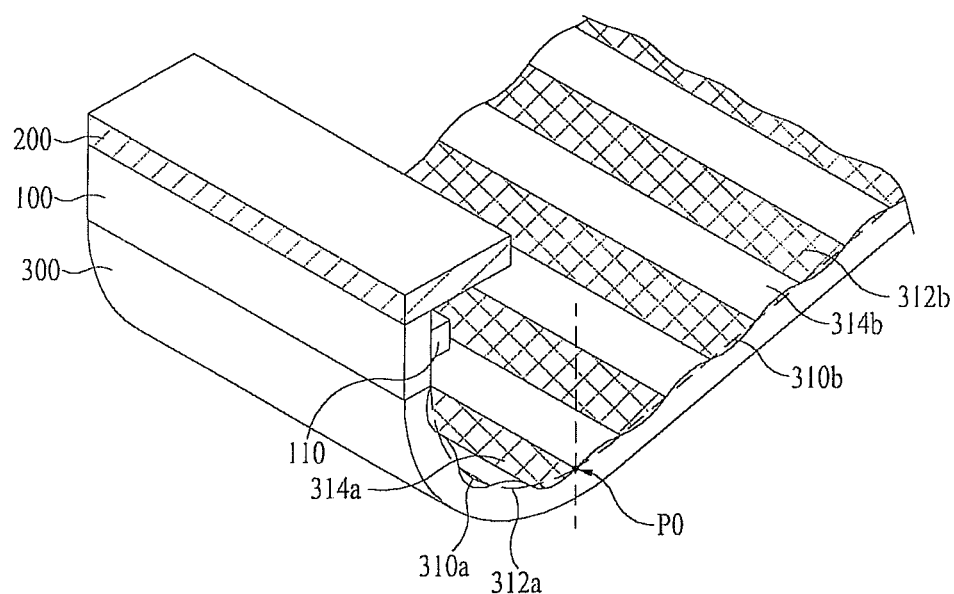

FIGS. 36A and 36B are views showing a second reflector having a plurality of diffuse reflection areas exhibiting different light reflection properties. FIG. 36A is a sectional view of the second reflector and FIG. 36B is a top perspective view of the second reflector.

As shown in FIGS. 36A and 36B, the second reflector 300 may include an inclined surface 310 having at least one inflection point P0. The second reflector 300 may have a plurality of patterns in which concave lines 312 and convex lines 314 are alternately arranged along the inclined surface 310 in one direction.

The concave lines 312 of the second reflector 300 may be concavely curved from the inclined surface 310. The convex lines 314 of the second reflector 300 may be convexly curved from the inclined surface 310.

The inclined surface 310 of the second reflector 300 may be at a predetermined angle to the horizontal surface parallel to the surface of the first reflector 200.

For example, the second reflector 300 may include at least two inclined surfaces 310 having at least one inflection point P0. As shown in FIGS. 36A and 36B, the second reflector 300 may include a first inclined surface 310a having a first curvature R1 and a second inclined surface 310b having a second curvature R2.

That is, the curvatures R1 and R2 the first and second inclined surfaces 310a and 310b adjacent to each other about the inflection point P0 of the second reflector 300 may be different from each other.

The curvature R1 of the first inclined surface 310a adjacent to the light source module 100 may be greater than the curvature R21 of the second inclined surface 310b adjacent to the first inclined surface 310a.

The concave lines 312 and convex lines 314 of the second reflector 300 may be alternately arranged along the first and second inclined surfaces 310a and 310b in one direction.

The concave lines 312 having concavely curved surfaces and the convex lines 314 having convexly curved surfaces may be arranged in the same direction as the direction in which light sources of the light source module 100 are arranged.

The concave lines 312 and convex lines 314 may include first concave lines 312a and first convex lines 314a arranged along the first inclined surface 310a. Also, the concave lines 312 and the convex lines 314 may include second concave lines 312b and second convex lines 314b arranged along the second inclined surface 310b.

The first concave lines 312a and first convex lines 314a arranged along the first inclined surface 310a may have a first curvature r1 and second curvature r2, respectively.

The second concave lines 312b and second convex lines 314b arranged along the second inclined surface 310b may have a third curvature r3 and fourth curvature r4, respectively.

The first curvature r1, second curvature r2, third curvature r3 and fourth curvature r4 may be the same. According to circumstances, at least one of the curvatures may be different from the other curvatures.

For example, the first curvature r1 and second curvature r2 of the first concave lines 312a and first convex lines 314a arranged along the first inclined surface 310a may be equal to or different from the third curvature r3 and fourth curvature r4 of the second concave lines 312b and second convex lines 314b arranged along the second inclined surface 310b.

When the curvature R1 of the first inclined surface 310a of the second reflector 300 is greater than the curvature R2 of the second inclined surface 310b, the first curvature r1 and second curvature r2 of the first concave lines 312a and first convex lines 314a arranged along the first inclined surface 310a may be greater than the third curvature r3 and fourth curvature r4 of the second concave lines 312b and second convex lines 314b arranged along the second inclined surface 310b.

This is because the first concave lines 312a and first convex lines 314a arranged along the first inclined surface 310a reflect light emitted from the light source 110 to the central area of the second reflector 300 to provide uniform luminance.

Figure 37:
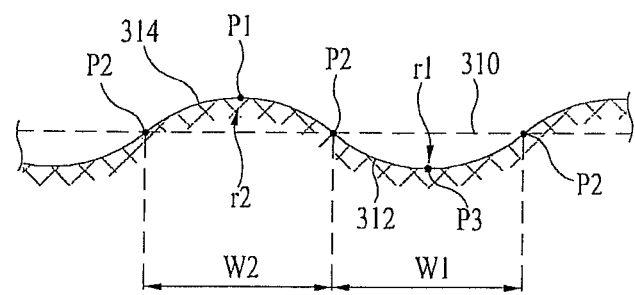
FIG. 37 is a view showing concave lines and convex lines of FIG. 36A in detail.

FIG. 37 is a view showing the concave lines and convex lines of FIG. 36A in detail.

As shown in FIG. 37, the concave lines 312 and convex lines 314 of the second reflector 300 may be alternately arranged along the inclined surface 310 of the second reflector 300.

The concave lines 312 may have surfaces concavely curved from the inclined surface 310 so as to have the first curvature r1.

That is, each of the concave lines 312 may have a curved surface passing a contact point P2 between each of the concave lines 312 and the inclined surface 310 and a peak point P3 of each of the concave lines. The width W1 of each of the concave lines 312 corresponds to the distance between two straight lines perpendicular to the inclined surface 310 and passing the respective contact points P2.

The convex lines 314 may have surfaces convexly curved from the inclined surface 310 so as to have the second curvature r2.

That is, each of the convex lines 314 may have a curved surface passing a contact point P2 between each of the convex lines 314 and the inclined surface 310 and a peak point P1 of each of the convex lines. The width W2 of each of the convex lines 314 corresponds to the distance between two straight lines perpendicular to the inclined surface 310 and passing the respective contact points P2.

The curvatures of the concave lines and convex lines may be decided based on a predetermined equation.

Figure 38:
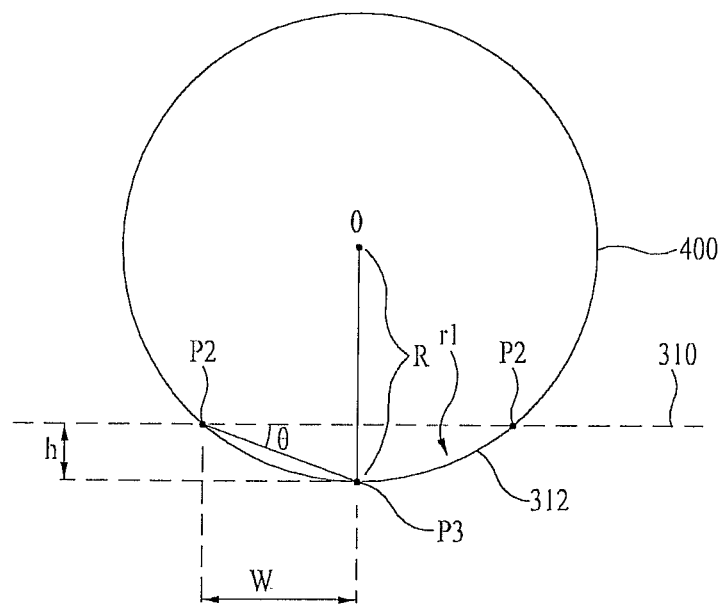
FIG. 38 is a view explaining a condition to decide curvature of the concave lines or the convex lines of FIG. 36A.

FIG. 38 is a view explaining a condition to decide curvature of the concave lines or the convex lines of FIG. 36A.

As shown in FIG. 38, the curvature r1 of each concave line 312 may satisfy a condition that an angle θ between the straight line connecting the contact point P2 between the concave line 312 and the inclined surface 310 and the peak point P3 of the concave line 312 and the inclined surface 310 is about 0.01 to 15 degrees.

The angle θ may be defined as represented by equation 1.

$$\theta = \tan^{-1}(h/W) = 0.01 \text{ to } 15 \text{ degrees} \quad \text{Equation 1}$$

Where, h indicates the maximum depth of the concave line 312, which is the minimum distance between the peak point P3 of the concave line 312 and the inclined surface 310.

W indicates the width of the concave line 312, which is the minimum distance between the contact point P2 between the concave line 312 and the inclined surface 310 and the vertical line connecting the peak point P3 of the concave line 312 and the inclined surface 310.

That is, equation 1 may be derived from the following numerical expression.

On the assumption that the straight distance connecting the central point O of an imaginary circle 400 passing the surface of the concave line 312 and the peak point P3 of the concave line 312 is R as shown in FIG. 38, $$(R-h)^2+W^2=R^2$$

$$h=R+/-\mathrm{sqrt}(R^2-W^2)$$

According to conditions based on R, W and h, therefore, the angle θ between the straight line connecting the contact point P2 between the concave line 312 and the inclined surface 310 and the peak point P3 of the concave line 312 and the inclined surface 310 may be $\tan^{-1}$ (h/W), which is about 0.01 to 15 degrees.

In a case in which the concave line 312 is formed to have the curvature based on the condition of the angle θ, a shadow effect does not occur due to the curved surface of the concave line when light is incident upon the concave line with the result that an apparent black area does not appear, and therefore, it is possible to manufacture a backlight unit exhibiting uniform luminance.

Each convex line may have the same condition as the concave line so as to prevent the occurrence of a shadow effect.

That is, in a case in which the concave line or the convex line is formed to have the curvature based on the condition of the angle θ, it is possible to manufacture a backlight unit exhibiting overall uniform luminance.

The concave line having the curvature r1 may serve to collect light, and the convex line having the curvature r2 may serve to disperse light.

In this embodiment, conditions such as the curvature of the inclined surface 310, the curvature of the concave line 312, the curvature of the convex line 314, the width of the concave line 312 and the width of the convex line 314, may be finely adjusted upon manufacturing the second reflector, thereby manufacturing an air guide type backlight unit exhibiting uniform luminance.

Figure 39:
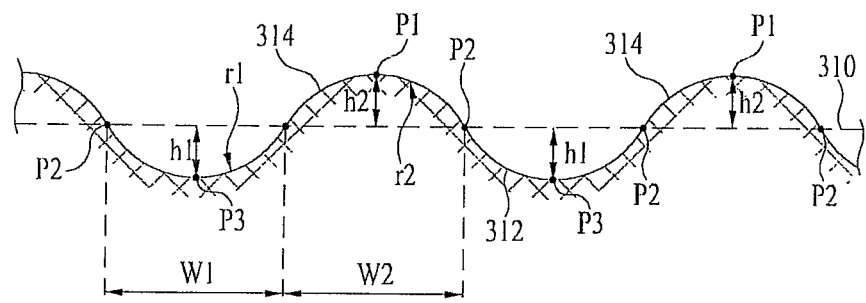
FIGS. 39 and 40A to 40D are views showing curvature relationships between the concave lines and the convex lines.

FIGS. 39 and 40A to 40D are views showing curvature relationships between the concave lines and the convex lines. In FIG. 39, the concave lines and the convex lines have the same curvature. In FIGS. 40A to 40D, the concave lines and the convex lines have different curvatures.

Referring first to FIG. 39, the concave lines 312 and the convex lines 314 may be alternately arranged along the inclined surface 310 of the second reflector 300.

Each of the concave lines 312 may have a surface concavely curved downward from the inclined surface 310. Each of the concave lines 312 may have a curvature r1.

That is, each of the concave lines 312 has a curved surface passing a contact point P2 with the inclined surface 310 and a peak point P3 of each of the concave lines.

The width W1 of each of the concave lines 312 corresponds to the distance between two straight lines, perpendicular to the inclined surface 310, passing the respective contact points P2. The maximum depth h1 of each of the concave lines 312 corresponds to the minimum distance between the peak point P3 and the inclined surface 310.

Also, each of the convex lines 314 may have a surface convexly curved upward from the inclined surface 310. Each of the convex lines 314 may have a curvature r2.

That is, each of the convex lines 314 has a curved surface passing a contact point P2 with the inclined surface 310 and a peak point P1 of each of the concave lines.

The width W2 of each of the convex lines 314 corresponds to the distance between two straight lines, perpendicular to the inclined surface 310, passing the respective contact points P2. The maximum height h2 of each of the convex lines 314 corresponds to the minimum distance between the peak point P1 and the inclined surface 310.

In this embodiment, therefore, as shown in FIG. 39, the curvature r1 of the concave lines 312 may be equal to the curvature r2 of the convex lines 314 adjacent to the respective concave lines 312.

The width W1 of the concave lines 312 may be equal to the width W2 of the convex lines 314.

The maximum depth h1 of the concave lines 312 may be equal to the maximum height h2 of each of the convex lines 314.

According to circumstances, the curvature r1 of the concave lines 312 may be different from the curvature r2 of the convex lines 314 adjacent to the respective concave lines 312.

FIGS. 40A to 40D show various embodiments in which neighboring ones of the concave lines 312 and convex lines 314 have different curvatures.

Figure 40A:
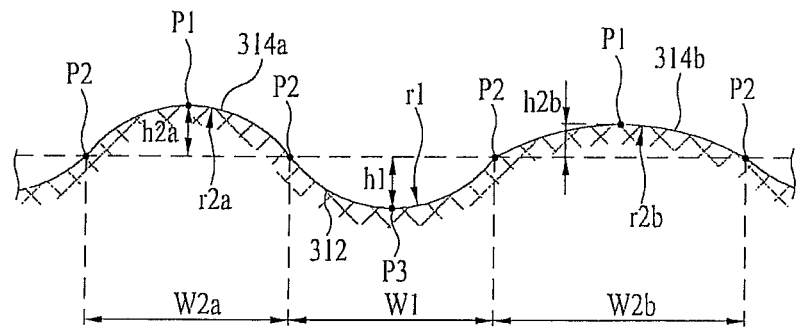
Figure 40B:
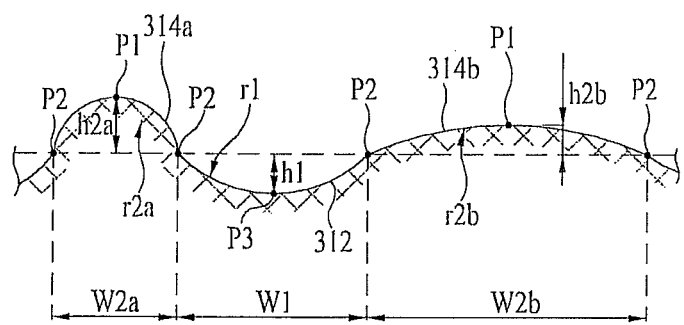

In FIG. 40A, a concave line 312 has a curvature equal to that of a first convex line 314a disposed at one side of the concave line 312 and a curvature different from that of a second convex line 314b disposed at the other side of the concave line 312. In FIG. 40B, a concave line 312 has a curvature different from that of a first convex line 314a disposed at one side of the concave line 312 and that of a second convex line 314b disposed at the other side of the concave line 312.

Figure 40C:
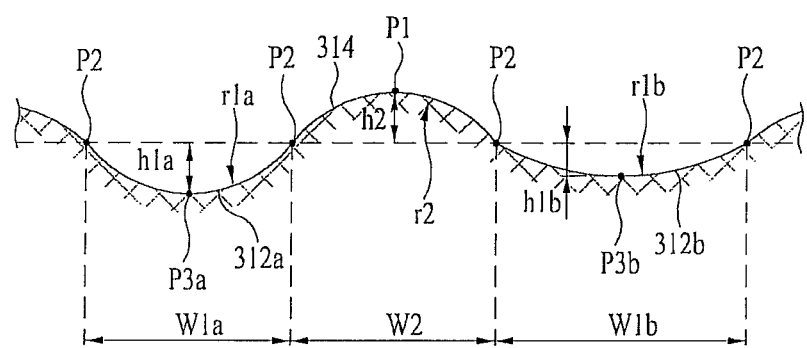
Figure 40D:
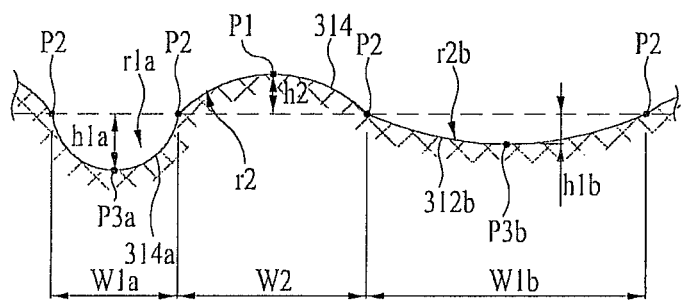

In FIG. 40C, a convex line 314 has a curvature equal to that of a first concave line 312a disposed at one side of the convex line 314 and a curvature different from that of a second concave line 312b disposed at the other side of the convex line 314. In FIG. 40D, a convex line 314 has a curvature different from that of a first concave line 312a disposed at one side of the convex line 314 and that of a second concave line 312b disposed at the other side of the convex line 314.

As shown in FIG. 40A, a first convex line 314a and a second convex line 314b may be disposed at opposite sides of a concave line 312. The curvature r2a of the first convex line 314a may be equal to the curvature r1 of the concave line 312 adjacent to the first convex line 314a. The curvature r2a of the first convex line 314a may be different from the curvature r2b of the second convex line 314b.

The width W1 of the concave line 312 may be equal to the width W2a of the first convex line 314a. The width W1 of the concave line 312 may be different from the width W2b of the second convex line 314b.

Also, the maximum depth h1 of the concave line 312 may be equal to the maximum height h2a of the first convex line 314a. The maximum depth h1 of the concave line 312 may be different from the maximum height h2b of the second convex line 314b.

As shown in FIG. 40B, a first convex line 314a and a second convex line 314b may be disposed at opposite sides of a concave line 312. The curvature r2a of the first convex line 314a may be different from the curvature r1 of the concave line 312 adjacent to the first convex line 314a. The curvature r2a of the first convex line 314a may also be different from the curvature r2b of the second convex line 314b.

The width W1 of the concave line 312 may be different from the width W2a of the first convex line 314a. The width W1 of the concave line 312 may also be different from the width W2b of the second convex line 314b.

Also, the maximum depth h1 of the concave line 312 may be different from the maximum height h2a of the first convex line 314a. The maximum depth h1 of the concave line 312 may also be different from the maximum height h2b of the second convex line 314b.

As shown in FIG. 40C, a first concave line 312a and a second concave line 312b may be disposed at opposite sides of a convex line 314. The curvature r1a of the first concave line 312a may be equal to the curvature r2 of the convex line 314 adjacent to the first concave line 312a. The curvature r1a of the first concave line 312a may be different from the curvature r1b of the second concave line 312b.

The width W2 of the convex line 314 may be equal to the width W1a of the first concave line 312a. The width W2 of the convex line 314 may be different from the width W1b of the second concave line 312b.

Also, the maximum height h2 of the convex line 314 may be equal to the maximum depth h1a of the first concave line 312a. The maximum height h2 of the convex line 314 may be different from the maximum depth h1b of the second concave line 312b.

As shown in FIG. 40D, a first concave line 312a and a second concave line 312b may be disposed at opposite sides of a convex line 314. The curvature r1a of the first concave line 312a may be different from the curvature r2 of the convex line 314 adjacent to the first concave line 312a. The curvature r1a of the first concave line 312a may also be different from the curvature rib of the second concave line 312b.

The width W2 of the convex line 314 may be different from the width W1a of the first concave line 312a. The width W2 of the convex line 314 may also be different from the width W1b of the second concave line 312b.

Also, the maximum height h2 of the convex line 314 may be different from the maximum depth h1a of the first concave line 312a. The maximum height h2 of the convex line 314 may also be different from the maximum depth h1b of the second concave line 312b.

The second reflector having a plurality of patterns in which the concave lines and convex lines are alternately arranged may be configured to have various shapes based on the arrangement of the light source module.

Figure 41A:
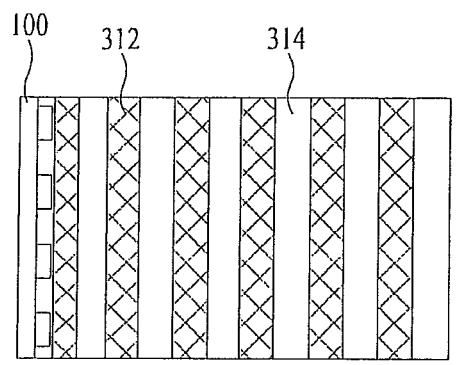
FIGS. 41A and 41B are views showing a one edge type second reflector.
Figure 41B:
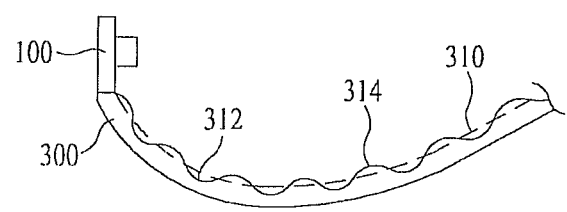
Figure 42A:
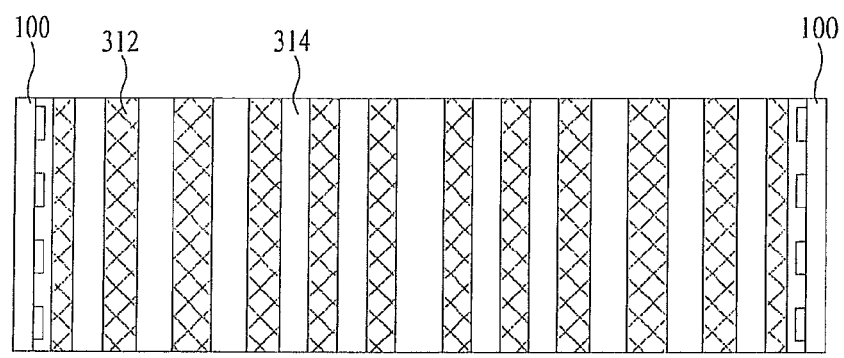
FIGS. 42A and 42B are views showing a two edge type second reflector.
Figure 42B:
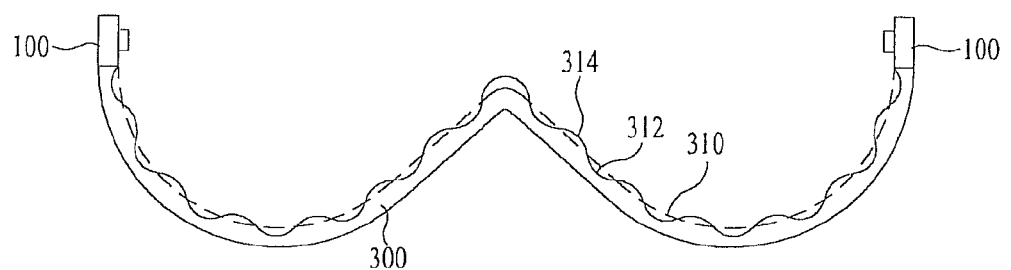
Figure 43:
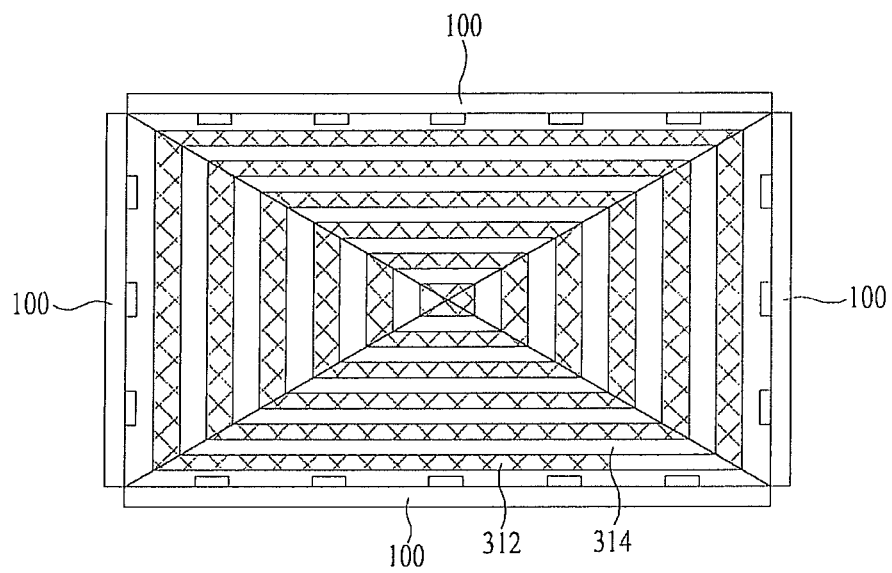
FIGS. 43 and 44 are views showing four edge type second reflectors.
Figure 44:
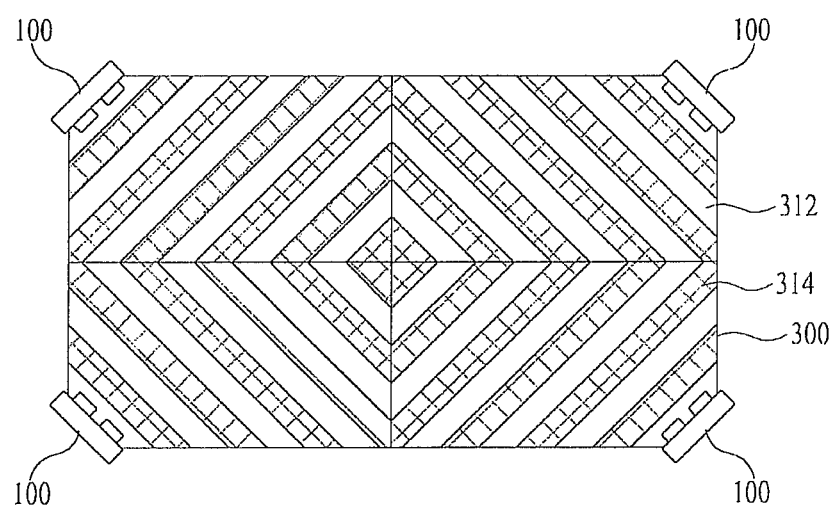

FIGS. 41A and 41B are views showing a one edge type second reflector. FIGS. 42A and 42B are views showing a two edge type second reflector. FIGS. 43 and 44 are views showing four edge type second reflectors.

FIG. 41A is a plan view of the one edge type second reflector. FIG. 41B is a sectional view of FIG. 41A.

As shown in FIGS. 41A and 41B, a light source module 100 may be disposed at one side of the one edge type second reflector 300. Concave lines 312 and convex lines 314 may be alternately arranged along an inclined surface 310 of the second reflector 300.

The inclined surface 310 of the second reflector 300 has an inflection point. The inclined surface 310 includes a first inclined surface and second inclined surface divided about the inflection point.

The first inclined surface may be adjacent to the light source module 100. The first inclined surface may be disposed between the light source module 100 and the second inclined surface.

The curvature of the concave lines and convex lines arranged along the first inclined surface may be equal to that of the concave lines and convex lines arranged along the second inclined surface. According to circumstances, the curvature of the concave lines and convex lines arranged along the first inclined surface may be different from that of the concave lines and convex lines arranged along the second inclined surface.

The concave lines and convex lines arranged along the first inclined surface and second inclined surface may have the same length.

FIG. 42A is a plan view of the two edge type second reflector. FIG. 42B is a sectional view of FIG. 42A.

As shown in FIGS. 41A and 41B, a light source module 100 may be disposed at one side of the one edge type second reflector 300. Concave lines 312 and convex lines 314 may be alternately arranged along an inclined surface 310 of the second reflector 300.

The inclined surface 310 of the second reflector 300 may have an inflection point. The inclined surface 310 may include a first inclined surface and second inclined surface divided about the inflection point.

The first inclined surface may be adjacent to the light source module 100. The first inclined surface may be disposed between the light source module 100 and the second inclined surface.

The curvature of the concave lines and convex lines arranged along the first inclined surface may be equal to that of the concave lines and convex lines arranged along the second inclined surface. According to circumstances, the curvature of the concave lines and convex lines arranged along the first inclined surface may be different from that of the concave lines and convex lines arranged along the second inclined surface.

The concave lines and convex lines arranged along the first inclined surface and second inclined surface may have the same length.

As shown in FIGS. 42A and 42B, light source modules 100 may be disposed at opposite sides of the two edge type second reflector 300. Concave lines 312 and convex lines 314 may be alternately arranged along an inclined surface 310 of the second reflector 300.

The inclined surface 310 of the second reflector 300 may include a plurality of inclined surfaces having at least two inflection points.

The inclined surfaces may be symmetrical with respect to the inflection points. The concave lines 312 and convex lines 314 arranged along the respective inclined surfaces may have the same curvature. According to circumstances, the curvature of the concave lines and convex lines arranged along at least one of the inclined surfaces may be different from that of the concave lines and convex lines arranged along the other the inclined surfaces.

The concave lines and convex lines arranged along the respective inclined surfaces may have the same length.

FIG. 43 is a plan view of the four edge type second reflector.

As shown in FIG. 43, light source modules 100 may be disposed at four sides of the four edge type second reflector 300. Concave lines 312 and convex lines 314 may be alternately arranged along an inclined surface of the second reflector 300.

The inclined surface of the second reflector 300 may be formed so as to correspond to the light source modules 100 disposed at the respective sides of the second reflector 300.

That is, the inclined surface of the second reflector 300 may include a first inclined surface corresponding to a light source module 100 disposed at a first side of the second reflector 300, a second inclined surface corresponding to a light source module 100 disposed at a second side, facing the first side, of the second reflector 300, a third inclined surface corresponding to a light source module 100 disposed at a third side of the second reflector 300, and a fourth inclined surface corresponding to a light source module 100 disposed at a fourth side, facing the third side, of the second reflector 300.

Each of the first, second, third and fourth inclined surfaces may include two inclined surfaces having an inflection point.

The width of each of the inclined surfaces may gradually decrease from a corresponding one of the light source modules to the central area of the second reflector. The length of the concave lines and convex lens arranged along each inclined surface at an area adjacent to a corresponding one of the light source modules 100 may be greater than that of the concave lines and convex lens arranged along each inclined surface at an area distant from a corresponding one of the light source modules 100.

The concave lines and convex lines arranged along the respective inclined surfaces may have the same curvature. According to circumstances, the curvature of the concave lines and convex lines arranged along at least one of the inclined surfaces may be different from that of the concave lines and convex lines arranged along the other the inclined surfaces.

FIG. 44 is a plan view of the four edge type second reflector.

As shown in FIG. 44, light source modules 100 may be disposed at four corners of the four edge type second reflector 300. Concave lines 312 and convex lines 314 may be alternately arranged along an inclined surface of the second reflector 300.

The inclined surface of the second reflector 300 may be formed so as to correspond to the light source modules 100 disposed at the respective corners of the second reflector 300.

That is, the inclined surface of the second reflector 300 may include a first inclined surface corresponding to a light source module 100 disposed at a first corner of the second reflector 300, a second inclined surface corresponding to a light source module 100 disposed at a second corner, facing the first corner, of the second reflector 300, a third inclined surface corresponding to a light source module 100 disposed at a third corner of the second reflector 300, and a fourth inclined surface corresponding to a light source module 100 disposed at a fourth corner, facing the third corner, of the second reflector 300.

Each of the first, second, third and fourth inclined surfaces may include two inclined surfaces having an inflection point.

The width of each of the inclined surfaces may gradually increase and decrease from a corresponding one of the light source modules to the central area of the second reflector. The length of the concave lines and convex lens arranged along each inclined surface may increase and decrease from an area adjacent to a corresponding one of the light source modules 100 to an area distant from a corresponding one of the light source modules 100.

The concave lines and convex lines arranged along the respective inclined surfaces may have the same curvature. According to circumstances, the curvature of the concave lines and convex lines arranged along at least one of the inclined surfaces may be different from that of the concave lines and convex lines arranged along the other the inclined surfaces.

The concave lines and convex lines of the second reflector may vary depending upon shapes of the inclined surfaces based on positions of the light source modules. According to circumstances, the concave lines and convex lines of the second reflector may vary depending upon surface shapes of the inclined surfaces of the second reflector.

Figure 45A:
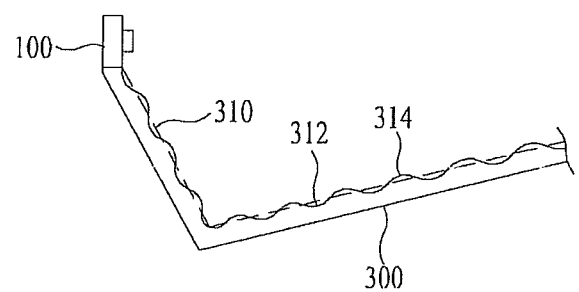
FIGS. 45A to 45C are views showing inclined surfaces of the second reflector.
Figure 45B:
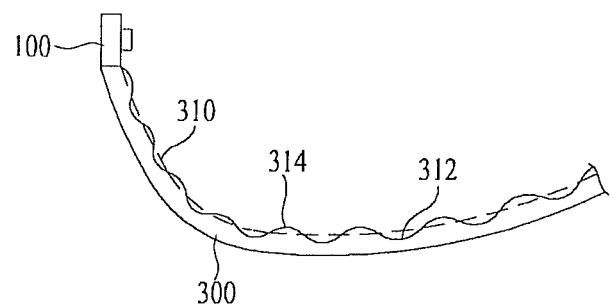
Figure 45C:
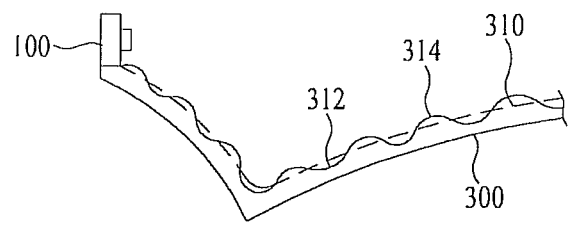

FIGS. 45A to 45C are views showing inclined surfaces of the second reflector. In FIG. 45A, the inclined surface is flat. In FIGS. 45B and 45C, the inclined surfaces are curved.

As shown in FIG. 45A, the inclined surface 310 of the second reflector 300 may be flat. Concave lines 312 and convex lines 314 may be alternately arranged along the inclined surface 310, which is flat.

As shown in FIG. 45B, the inclined surface 310 of the second reflector 300 may be concavely curved. Concave lines 312 and convex lines 314 may be alternately arranged along the inclined surface 310, which is concavely curved.

As shown in FIG. 45C, the inclined surface 310 of the second reflector 300 may be convexly curved. Concave lines 312 and convex lines 314 may be alternately arranged along the inclined surface 310, which is convexly curved.

The inclined surface 310 of the second reflector 300 may be configured so that an angle of inclination of at least a portion of the inclined surface increases and decreases. Alternatively, the inclined surface 310 of the second reflector 300 may be configured so that an angle of inclination of at least a portion of the inclined surface increases, remains uniform and decreases.

The inclined surface 310 of the second reflector 300 may be at least one selected from among a concave surface, a convex surface and a flat surface.

Meanwhile, the size of the inclined surface 310 of the second reflector 300 may vary depending upon the position of the first reflector.

Figure 46:
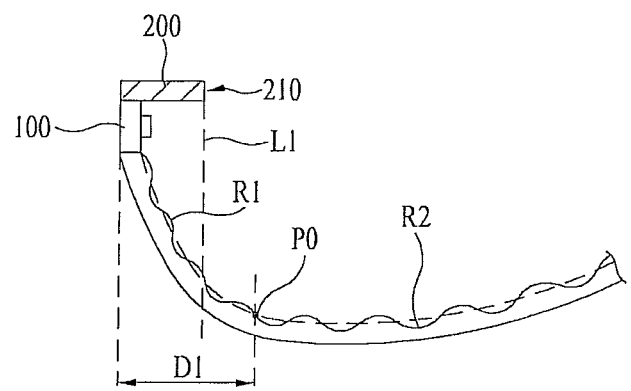
FIG. 46 is a view explaining a positional relationship between the first reflector and the second reflector.

FIG. 46 is a view explaining a positional relationship between the first reflector and the second reflector.

As shown in FIG. 46, a light source module 100 is disposed between the first reflector 200 and the second reflector 300. The second reflector 300 may include a first inclined surface, having a curvature R1, and a second inclined surface, having a curvature R2, adjacent to each other about an inflection point P0.

The first inclined surface may be adjacent to the light source module 100. The first inclined surface may be disposed between the light source module 100 and the second inclined surface.

The first inclined surface may be located within a distance D1 between a line, passing the inflection point P0, perpendicular to the inclined surface and the end point of the light source module 100. The first reflector 200 may be disposed so as to overlap with the first inclined surface of the second reflector 300.

That is, the length of the first reflector 200 may be adjusted so that a perpendicular line L1 passing one end point 210 of the first reflector 200 and the inclined surface of the second reflector 300 is located within the distance D1.

As a result, light having uniform luminance is reflected and the light emission area of the backlight unit is maximized.

Concave lines and convex lines may be alternately arranged along the first inclined surface having the curvature R1 and the second inclined surface having the curvature R2.

The inclined surface of the second reflector 300 may include first and second inclined surfaces. The first inclined surface may be adjacent to the light source module 100. The first inclined surface and second inclined surface may be successively arranged in contact with each other.

The curvature R1 of the first inclined surface may be greater than the curvature R2 of the second inclined surface. The first inclined surface may overlap with the first reflector 200.

According to circumstances, the first inclined surface and second inclined surface may be spaced a predetermined distance from each other. A flat surface parallel to the first reflector may be disposed between the first inclined surface and second inclined surface.

Figure 47:
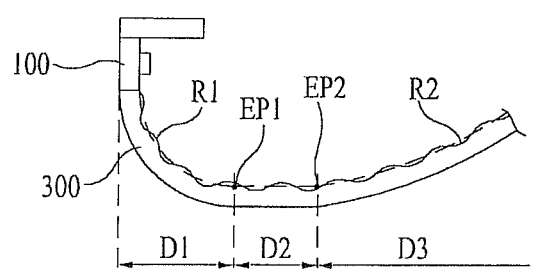
FIG. 47 is a view showing another embodiment of the second reflector.

FIG. 47 is a view showing another embodiment of the second reflector.

As shown in FIG. 47, the second reflector 300 may include a first inclined surface having a curvature R1 and a second inclined surface having a curvature R2. The first inclined surface and second inclined surface may be spaced a predetermined distance from each other.

A horizontal surface parallel to the surface of the first reflector may be disposed between the first inclined surface and second inclined surface.

The width of the horizontal surface may be a distance D2 between one end point EP1 of the first inclined surface and one end point EP2 of the second inclined surface.

The width of the first inclined surface having the curvature R1 may be a distance D1 between the light source module 100 and the end point EP1 of the first inclined surface. The width of the second inclined surface having the curvature R2 may be a distance D3 between one end point EP2 and the other end point of the second inclined surface.

The width D1 of the horizontal surface may be less than the width D2 of the first inclined surface having the curvature R1 and the width D3 of the second inclined surface having the curvature R2. The width D2 of the first inclined surface having the curvature R1 may be greater than the width D1 of the horizontal surface and less than the width D3 of the second inclined surface having the curvature R2.

According to circumstances, the horizontal surface parallel to the surface of the first reflector may be between the light source module 100 and the first inclined surface or at a portion of the second inclined surface as well as between the first inclined surface and second inclined surface.

Concave lines and convex lines may be alternately arranged along the first inclined surface having the curvature R1 and the second inclined surface having the curvature R2. Alternatively, the concave lines and convex lines may be alternately arranged along the horizontal surface.

Meanwhile, the backlight unit according to the embodiment may further include an optical member spaced a predetermined distance from the second reflector. An air guide may be defined between the second reflector and the optical member.

In this embodiment, a light emission surface of the light source module may be oriented in various directions.

That is, the light source module may be of a direct emitting type in which the light emission surface is oriented toward the air guide between the optical member and the second reflector or may be of an indirect emitting type in which the light emission surface is oriented toward any one selected from among the first reflector, the second reflector and a cover plate.

Light emitted from the indirect emitting type light source module may be reflected from the first reflector, the second reflector and the cover plate and the reflected light may be directed toward the air guide of the backlight unit.

The indirect emitting type light source module serves to reduce a hot spot phenomenon.

Also, a plurality of reinforcement ribs may be disposed at a lower surface of the second reflector.

Figure 48:
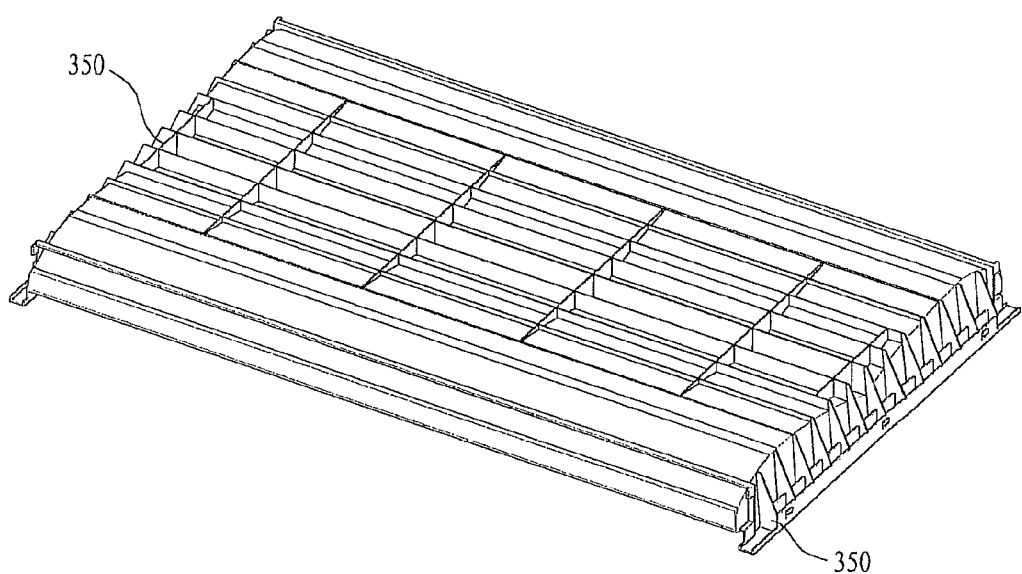
FIG. 48 is a view showing reinforcing ribs formed at a lower surface of the second reflector.

FIG. 48 is a view showing reinforcing ribs formed at a lower surface of the second reflector. As shown in FIG. 48, a plurality of reinforcement ribs 350 may be disposed at the lower surface of the second reflector.

Since the second reflector, having a curved reflective surface, may be deformed depending upon external environmental conditions, the reinforcement ribs 350 may be disposed to prevent deformation of the second reflector.

The reinforcement ribs 350 may be arranged at a rear surface facing the inclined surface of the second reflector and at a rear surface facing a lateral surface of the second reflector.

Support pins to support the optical member may be formed at an upper surface of the second reflector.

Figure 49:
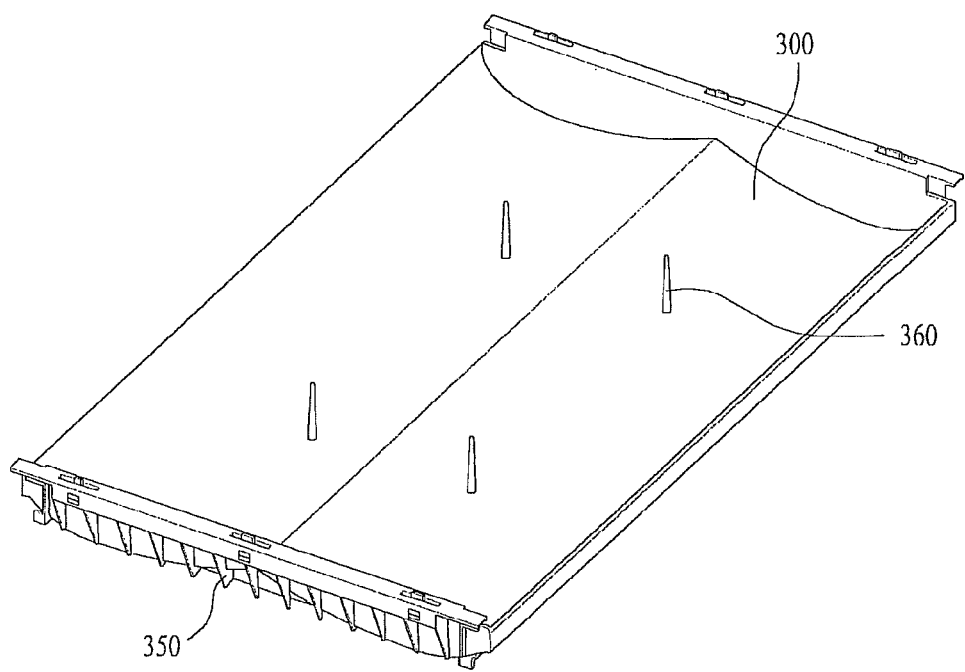
FIG. 49 is a view showing support pins formed at an upper surface of the second reflector.

FIG. 49 is a view showing support pins formed at the upper surface of the second reflector. As shown in FIG. 49, support pins 360 to support the optical member may be formed at the upper surface of the second reflector 300.

This is because the optical member is spaced apart from the second reflector 300 to define an air guide therebetween with the result that a central area of the optical member may sag.

The support pins 360 may be configured so that the size of the lower surface thereof coming into contact with the second reflector 300 is greater than that of the upper surface thereof.

Meanwhile, circuit devices to drive the light source module may be arranged under the inclined surfaces of the second reflector.

A space is defined under the second reflector between the inclined surfaces thereof. Thus, arranging the circuit devices in the space enables efficient space utilization.

Figure 50:
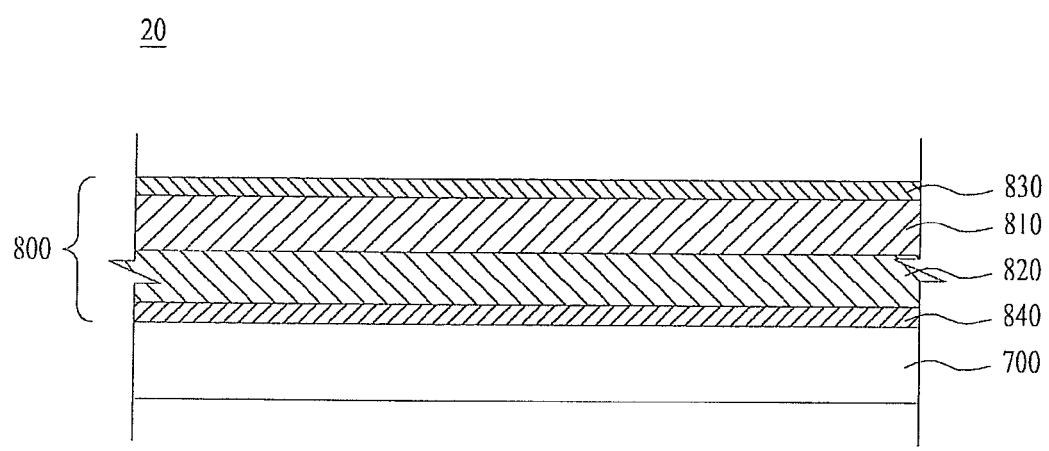
FIG. 50 is a view showing a display module including a backlight unit according to an embodiment.

FIG. 50 is a view showing a display module including a backlight unit according to an embodiment.

As shown in FIG. 50, the display module 20 may include a display panel 800 and a backlight unit 700.

The display panel 800 may include a color filter substrate 810 and a thin film transistor (TFT) substrate 820, which are bonded to face each other with a uniform cell gap therebetween. A liquid crystal layer (not shown) may be disposed between the two substrates 810 and 820.

An upper polarizing plate 830 and a lower polarizing plate 840 may be disposed respectively on and under the display panel 800. More specifically, the upper polarizing plate 830 may be disposed at an upper surface of the color filter substrate 810 and the lower polarizing plate 840 may be disposed at a lower surface of the TFT substrate 820.

Although not shown, gate and data drive units to generate drive signals required to drive the panel 800 may be provided at a lateral surface of the display panel 800.

Figure 51:
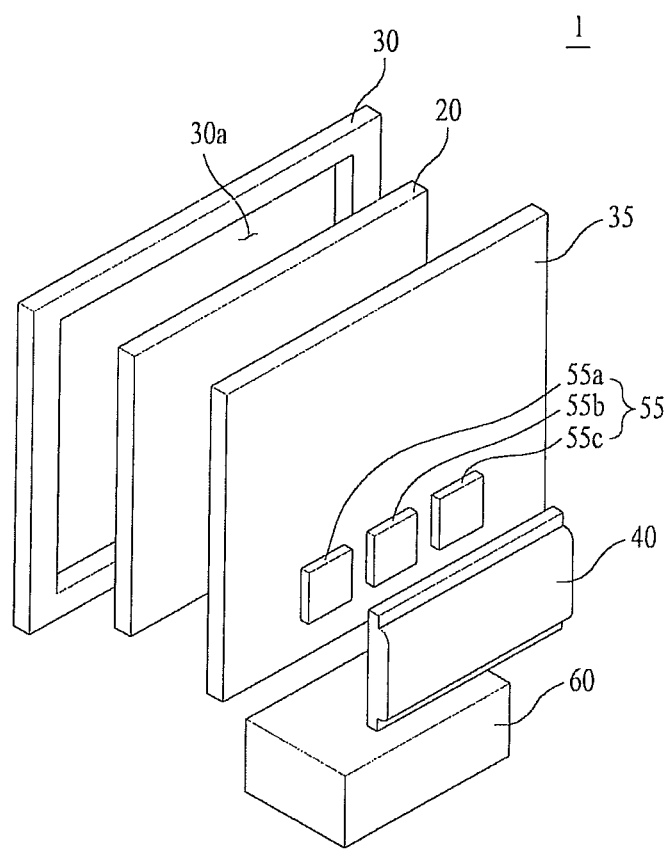
FIGS. 51 and 52 are views showing a display apparatus according to an embodiment.
Figure 52:
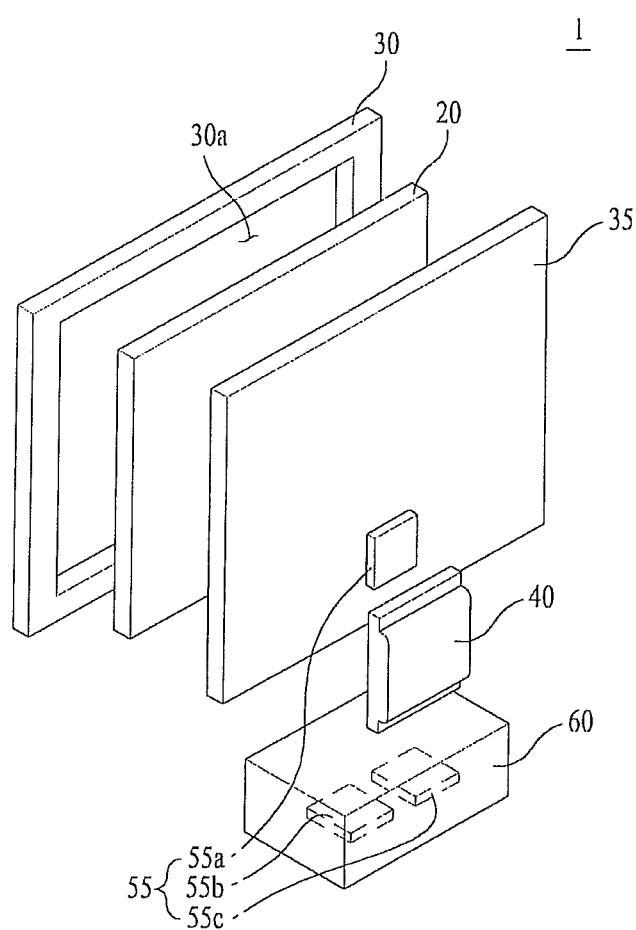

FIGS. 51 and 52 are views showing a display apparatus according to an embodiment.

Referring to FIG. 51, the display apparatus 1 may include a display module 20, a front cover 30 and back cover 35 to cover the display module 20, a drive unit 55 provided at the back cover 35, and a drive unit cover 40 to enclose the drive unit 55.

The front cover 30 may include a transparent front panel (not shown) to ensure transmission of light. The front panel serves to protect the display module 20 spaced apart therefrom by a predetermined distance and to transmit light emitted from the display module 20 so that an image displayed on the display module 20 can be seen from the outside.

The back cover 35 may be coupled to the front cover 30 so as to project the display module 20.

The drive unit 55 may be disposed on a surface of the back cover 35.

The drive unit 55 may include a drive controller 55a, a main board 55b and a power supply 55c.

The drive controller 55a may be a timing controller. The drive controller 55a serves to adjust an operation timing of each driver IC of the display module 20. The main board 55b may serve to transmit V-sync, H-sync and R, G and B resolution signals to the timing controller. The power supply 55c supplies power to the display module 20.

The drive unit 55 may be provided at the back cover 35 and enclosed by the drive unit cover 40.

The back cover 35 has a plurality of holes, through which the display module 20 may be connected to the drive unit 55. Also, a stand 60 to support the display apparatus 1 may be provided.

On the other hand, as shown in FIG. 52, the drive controller 55a of the drive unit 55 may be provided at the back cover 35, and the main board 55b and the power supply 55c may be provided in the stand 60.

The drive unit cover 40 may be configured to enclose only the drive unit 55 provided at the back cover 35.

In this embodiment, the main board 55b and the power supply 55c are provided separately. Alternatively, the main board 55b and the power supply 55c may be integrated, without being limited thereto.

As is apparent from the above description, according to the embodiments of the present invention, the reflector for the air guide is formed to have the specular reflection area and the diffuse reflection area. Consequently, the backlight unit is lightweight, is manufactured at low cost and provides uniform luminance.

Thus, economic efficiency and reliability of the backlight unit are improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
    a first reflector;
    a second reflector; and
    at least one light source disposed between the first reflector and the second reflector, wherein the second reflector comprises a specular reflection area and a diffuse reflection area, and the specular reflection area occupies about 5 to 50% of an entire area of the second reflector,
    wherein the diffuse reflection area comprises first and second diffuse reflection areas, and
    wherein the first diffuse reflection area is configured so that a quantity of light reflected in a Gaussian distribution is greater than a quantity of light reflected in a Lambertian distribution, and the second diffuse reflection area is configured so that a quantity of light reflected in the Lambertian distribution is greater than a quantity of light reflected in the Gaussian distribution.

2. The backlight unit according to claim 1, wherein the diffuse reflection area reflects incident light in a Lambertian distribution and a Gaussian distribution, and an incidence angle of light incident upon each point of the diffuse reflection area is about 55 degrees or more with respect to a line normal to a surface of the second reflector and passing each point.

3. The backlight unit according to claim 1, wherein an incidence angle of light incident upon each point of the first diffuse reflection area is about 55 degrees or more with respect to a line normal to a surface of the second reflector and passing each point, and an incidence angle of light incident upon each point of the second diffuse reflection area is about 60 degrees or more with respect to a the line passing each point.

4. The backlight unit according to claim 1, wherein a size ratio of the first diffuse reflection area to the second diffuse reflection area is between 1:1 and 1:5.

5. The backlight unit according to claim 1, wherein a size ratio of the specular reflection area to the first diffuse reflection area is between 1:1 and 1:4.

6. The backlight unit according to claim 1, wherein a size ratio of the specular reflection area to the second diffuse reflection area is between 1:1 and 1:20.

7. The backlight unit according to claim 1, wherein the first diffuse reflection area is located between the specular reflection area and the second diffuse reflection area.

8. The backlight unit according to claim 1, wherein each of the first and second diffuse reflection areas comprises a first layer formed of polyethylene terephthalate (PET) and a second layer formed on the first layer, the second layer being formed of $TiO_2$ and/or $SiO_2$ particles.

9. The backlight unit according to claim 8, wherein particle weight contained in the first diffuse reflection area is less than particle weight contained in the second diffuse reflection area.

10. The backlight unit according to claim 1, wherein the second reflector comprises at least one inclined surface and at least one flat surface, the flat surface of the second reflector being parallel to the first reflector.

11. The backlight unit according to claim 1, wherein the second reflector comprises at least two inclined surfaces having at least one inflection point, and first and second inclined surfaces adjacent to each other about the inflection point have different curvatures.

12. The backlight unit according to claim 1, further comprising an optical member spaced a predetermined distance from the second reflector, wherein an air guide is defined between the second reflector and the optical member.

13. The backlight unit according to claim 1, wherein size percentage of the specular reflection area of the second reflector decreases as the specular reflection area becomes distant from the light source.

14. The backlight unit according to claim 1, wherein the second reflector comprises an inclined surface having at least one inflection point and has a pattern in which concave regions and convex regions are alternately arranged along the inclined surface.

15. The backlight unit according to claim 14, wherein the concave regions of the second reflector are concavely curved from the inclined surface, and the convex regions of the second reflector are convexly curved from the inclined surface.

16. A backlight unit comprising:
    a first reflector;
    a second reflector; and
    at least one light source disposed between the first reflector and the second reflector, wherein the second reflector comprises a specular reflection area and a diffuse reflection area, and the specular reflection area occupies about 5 to 50% of an entire area of the second reflector,
    wherein the second reflector comprises an inclined surface having at least one inflection point and has a pattern in which concave regions and convex regions are alternately arranged along the inclined surface, and
    wherein each of the concave regions has a curvature to satisfy a condition that an angle θ between a straight line connecting a contact point between each of the concave regions and the inclined surface and a low point of each of the concave regions and the inclined surface is about 0.01 to 15 degrees.

17. The backlight unit according to claim 16, wherein the angle is defined as represented by equation:

$$\theta = \tan^{-1}(h/W) = 0.01 \text{ to } 15 \text{ degrees}$$

where, h indicates a maximum depth of each of the concave regions (a minimum distance between the low point of each of the concave regions and the inclined surface) and W indicates a width of each of the concave regions (a minimum distance between the contact point between each of the concave regions and the inclined surface and a vertical line connecting the low point of each of the concave regions and the inclined surface).

18. The backlight unit according to claim 14, wherein neighboring ones of the concave regions and convex regions have different curvatures.

19. A display apparatus comprising:
a display panel; and
a backlight unit to irradiate light to the display panel, wherein the backlight unit comprises:
a first reflector;
a second reflector; and
at least one light source disposed between the first reflector and the second reflector,
the second reflector comprising a specular reflection area and a diffuse reflection area,
the specular reflection area occupying about 5 to 50% of an entire area of the second reflector,
wherein the diffuse reflection area comprises first and second diffuse reflection areas, and
wherein the first diffuse reflection area is configured so that a quantity of light reflected in a Gaussian distribution is greater than a quantity of light reflected in a Lambertian distribution, and the second diffuse reflection area is configured so that a quantity of light reflected in the Lambertian distribution is greater than a quantity of light reflected in the Gaussian distribution.

20. The display apparatus according to claim 19, wherein an incidence angle of light incident upon each point of the first diffuse reflection area is about 55 degrees or more with respect to a line normal to a surface of the second reflector and passing each point, and an incidence angle of light incident upon each point of the second diffuse reflection area is about 60 degrees or more with respect to the line passing each point.

21. The display apparatus according to claim 19, wherein the second reflector comprises an inclined surface having at least one inflection point and has a pattern in which concave regions and convex regions are alternately arranged along the inclined surface, and wherein each of the convex regions has a curvature to satisfy a condition that an angle θ between a straight line connecting a contact point between each of the convex regions and the inclined surface and a low point of each of the convex regions and the inclined surface is about 0.01 to 15 degrees, and wherein the angle is defined as represented by an equation:

$$\theta = \tan^{-1}(h/W) = 0.01 \text{ to } 15 \text{ degrees}$$

where, h indicates a maximum height of each of the convex regions (a minimum distance between the low point of each of the convex regions and the inclined surface) and W indicates a width of each of the convex regions (a minimum distance between the contact point between each of the convex regions and the inclined surface and a vertical line connecting the low point of each of the convex regions and the inclined surface).

22. The backlight unit according to claim 1, further comprising an optical member spaced a predetermined distance from the second reflector, wherein no light guide plate is provided between the second reflector and the optical member.

* * * * *